(12) United States Patent
Pilliod et al.

(10) Patent No.: US 10,551,722 B2
(45) Date of Patent: Feb. 4, 2020

(54) FUSED OPAQUE AND CLEAR GLASS FOR CAMERA OR DISPLAY WINDOW

(71) Applicant: Apple Inc., Cupertino, CA (US)

(72) Inventors: Michael K. Pilliod, Venice, CA (US); Peter N. Russell-Clarke, San Francisco, CA (US); Douglas J. Weber, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/141,028

(22) Filed: Sep. 25, 2018

(65) Prior Publication Data
US 2019/0025673 A1      Jan. 24, 2019

Related U.S. Application Data

(63) Continuation of application No. 13/492,620, filed on Jun. 8, 2012, now Pat. No. 10,133,156, which is a
(Continued)

(51) Int. Cl.
*G03B 17/02* (2006.01)
*C03B 23/20* (2006.01)
(Continued)

(52) U.S. Cl.
CPC .............. *G03B 17/02* (2013.01); *C03B 23/20* (2013.01); *G03B 15/05* (2013.01); *H04N 5/2254* (2013.01); *G03B 2215/0503* (2013.01)

(58) Field of Classification Search
CPC ...........................................................
G03G 11/045; G02B 27/0018; H04M 1/0264
See application file for complete search history.

(56) References Cited

U.S. PATENT DOCUMENTS

| 2,643,020 A | 6/1953 | Dalton |
| 3,415,637 A | 12/1968 | Glynn |

(Continued)

FOREIGN PATENT DOCUMENTS

| AT | 283630 | 10/1970 |
| CN | 1277090 | 12/2000 |

(Continued)

OTHER PUBLICATIONS

Copending U.S. Appl. No. 13/492,620 (U.S. Pat. No. 10,133,156 not yet published) (Year: 2018).*

(Continued)

*Primary Examiner* — Minh Q Phan
(74) *Attorney, Agent, or Firm* — Brownstein Hyatt Farber Schreck, LLP

(57) ABSTRACT

Apparatus, systems and methods for windows integration with cover glass and for processing cover glass to provide windows for electronic devices are disclosed. Transparent windows such as a transparent camera window, a transparent illuminator window and/or a transparent display window can be integrated into the cover glass. The apparatus, systems and methods are especially suitable for cover glasses, or displays (e.g., LCD displays), assembled in small form factor electronic devices such as handheld electronic devices (e.g., mobile phones, media players, personal digital assistants, remote controls, etc.). The apparatus, systems and methods can also be used for cover glasses or displays for other relatively larger form factor electronic devices (e.g., portable computers, tablet computers, displays, monitors, televisions, etc.).

19 Claims, 10 Drawing Sheets

Related U.S. Application Data continuation-in-part of application No. 13/347,430, filed on Jan. 10, 2012, now Pat. No. 8,684,613.

(51) Int. Cl.
*H04N 5/225* (2006.01)
*G03B 15/05* (2006.01)

(56) References Cited

U.S. PATENT DOCUMENTS

| | | | |
|---|---|---|---|
| 3,441,398 A | 4/1969 | Hess | |
| 3,467,508 A | 9/1969 | Loukes et al. | |
| 3,498,773 A | 3/1970 | Due et al. | |
| 3,558,415 A | 1/1971 | Rieser et al. | |
| 3,607,172 A | 9/1971 | Poole et al. | |
| 3,619,240 A | 11/1971 | Toussaint et al. | |
| 3,626,723 A | 12/1971 | Emile | |
| 3,652,244 A | 3/1972 | Plumat | |
| 3,753,840 A | 8/1973 | Plumat | |
| 3,798,013 A | 3/1974 | Hasegawa et al. | |
| 3,843,472 A | 10/1974 | Toussaint et al. | |
| 3,857,689 A | 12/1974 | Koizumi et al. | |
| 3,926,605 A | 12/1975 | Kunkle | |
| 3,951,707 A | 4/1976 | Kurtz et al. | |
| 4,015,045 A | 3/1977 | Rinehart | |
| 4,052,184 A | 10/1977 | Anderson | |
| 4,119,760 A | 10/1978 | Rinehart | |
| 4,156,755 A | 5/1979 | Rinehart | |
| 4,165,228 A | 8/1979 | Ebata et al. | |
| 4,178,082 A | 12/1979 | Ganswein et al. | |
| 4,212,919 A | 7/1980 | Hoda | |
| 4,218,230 A | 8/1980 | Hogan | |
| 4,346,601 A | 8/1982 | France | |
| 4,353,649 A | 10/1982 | Kishii | |
| 4,425,810 A | 1/1984 | Simon et al. | |
| 4,537,820 A | 8/1985 | Nowobilski et al. | |
| 4,646,722 A | 3/1987 | Silverstein et al. | |
| 4,733,973 A | 3/1988 | Machak et al. | |
| 4,842,629 A | 6/1989 | Clemens et al. | |
| 4,844,724 A | 7/1989 | Sakai et al. | |
| 4,846,868 A | 7/1989 | Aratani | |
| 4,849,002 A | 7/1989 | Rapp | |
| 4,872,896 A | 10/1989 | LaCourse et al. | |
| 4,911,743 A | 3/1990 | Bagby | |
| 4,937,129 A | 6/1990 | Yamazaki | |
| 4,957,364 A | 9/1990 | Chesler | |
| 4,959,548 A | 9/1990 | Kupperman et al. | |
| 4,983,197 A | 1/1991 | Froning et al. | |
| 4,986,130 A | 1/1991 | Engelhaupt et al. | |
| 5,041,173 A | 8/1991 | Shikata et al. | |
| 5,104,435 A | 4/1992 | Oikawa et al. | |
| 5,129,934 A | 7/1992 | Koss | |
| 5,157,746 A | 10/1992 | Tobita et al. | |
| 5,160,523 A | 11/1992 | Honkanen et al. | |
| 5,254,149 A | 10/1993 | Hashemi et al. | |
| 5,269,888 A | 12/1993 | Morasca | |
| 5,281,303 A | 1/1994 | Beguin et al. | |
| 5,369,267 A | 11/1994 | Johnson et al. | |
| 5,411,563 A | 5/1995 | Yeh | |
| 5,437,193 A | 8/1995 | Schleitweiler et al. | |
| 5,445,871 A | 8/1995 | Murase et al. | |
| 5,483,261 A | 1/1996 | Yasutake | |
| 5,488,204 A | 1/1996 | Mead et al. | |
| 5,525,138 A | 6/1996 | Hashemi et al. | |
| 5,625,154 A | 4/1997 | Matsuhiro et al. | |
| 5,654,057 A | 8/1997 | Kitayama | |
| 5,725,625 A | 3/1998 | Kitayama et al. | |
| 5,733,622 A | 3/1998 | Starcke et al. | |
| 5,766,493 A | 6/1998 | Shin | |
| 5,780,371 A | 7/1998 | Rifqi et al. | |
| 5,816,225 A | 10/1998 | Koch et al. | |
| 5,825,352 A | 10/1998 | Bisset et al. | |
| 5,826,601 A | 10/1998 | Muraoka et al. | |
| 5,835,079 A | 11/1998 | Shieh | |
| 5,880,411 A | 3/1999 | Gillespie et al. | |
| 5,930,047 A | 7/1999 | Gunz et al. | |
| 5,953,094 A | 9/1999 | Matsuoka et al. | |
| 5,985,014 A | 11/1999 | Ueda et al. | |
| 6,050,870 A | 4/2000 | Suginoya et al. | |
| 6,114,039 A | 9/2000 | Rifqui | |
| 6,120,908 A | 9/2000 | Papanu et al. | |
| 6,166,915 A | 12/2000 | Lake et al. | |
| 6,188,391 B1 | 2/2001 | Seely et al. | |
| 6,245,313 B1 | 6/2001 | Suzuki et al. | |
| 6,287,674 B1 | 9/2001 | Verlinden et al. | |
| 6,307,590 B1 | 10/2001 | Yoshida | |
| 6,310,610 B1 | 10/2001 | Beaton et al. | |
| 6,323,846 B1 | 11/2001 | Westerman et al. | |
| 6,325,704 B1 | 12/2001 | Brown et al. | |
| 6,327,011 B2 | 12/2001 | Kim | |
| 6,350,664 B1 | 2/2002 | Haji et al. | |
| 6,373,025 B1* | 4/2002 | Takeuchi et al. | |
| 6,393,180 B1 | 5/2002 | Farries et al. | |
| 6,429,840 B1 | 8/2002 | Sekiguchi | |
| 6,437,867 B2 | 8/2002 | Zeylikovich et al. | |
| 6,516,634 B1 | 2/2003 | Green et al. | |
| 6,521,862 B1 | 2/2003 | Brannon | |
| 6,621,542 B1 | 9/2003 | Aruga | |
| 6,690,387 B2 | 2/2004 | Zimmerman et al. | |
| 6,718,612 B2 | 4/2004 | Bajorek | |
| 6,769,274 B2 | 8/2004 | Cho et al. | |
| 6,772,610 B1 | 8/2004 | Albrand et al. | |
| 6,810,688 B1 | 11/2004 | Duisit et al. | |
| 6,936,741 B2 | 8/2005 | Munnig et al. | |
| 6,955,971 B2 | 10/2005 | Ghyselen et al. | |
| 6,996,324 B2 | 2/2006 | Hiraka et al. | |
| 7,012,700 B2 | 3/2006 | De Groot et al. | |
| 7,013,709 B2 | 3/2006 | Hajduk et al. | |
| 7,015,894 B2 | 3/2006 | Morohoshi | |
| 7,070,837 B2 | 7/2006 | Ross | |
| 7,166,531 B1 | 1/2007 | Van Den Hoek et al. | |
| 7,184,064 B2 | 2/2007 | Zimmerman et al. | |
| 7,461,564 B2 | 12/2008 | Glaesemann | |
| 7,558,054 B1 | 7/2009 | Prest et al. | |
| 7,626,807 B2 | 12/2009 | Hsu | |
| 7,663,607 B2 | 2/2010 | Hotelling et al. | |
| 7,810,355 B2 | 10/2010 | Feinstein et al. | |
| 7,872,644 B2 | 1/2011 | Hong et al. | |
| 7,918,019 B2 | 4/2011 | Chang et al. | |
| 8,013,834 B2 | 9/2011 | Kim | |
| 8,110,268 B2 | 2/2012 | Hegemier et al. | |
| 8,111,248 B2 | 2/2012 | Lee et al. | |
| 8,312,743 B2 | 11/2012 | Pun et al. | |
| 8,391,010 B2 | 3/2013 | Rothkopf | |
| 8,393,175 B2 | 3/2013 | Kohli et al. | |
| 8,551,283 B2 | 10/2013 | Pakula et al. | |
| 8,673,163 B2 | 3/2014 | Zhong | |
| 8,684,613 B2 | 4/2014 | Weber et al. | |
| 8,824,140 B2 | 9/2014 | Prest | |
| 9,128,666 B2 | 9/2015 | Werner | |
| 10,018,891 B2* | 7/2018 | Weber | |
| 2002/0035853 A1 | 3/2002 | Brown et al. | |
| 2002/0105793 A1 | 8/2002 | Oda | |
| 2002/0155302 A1 | 10/2002 | Smith et al. | |
| 2002/0157199 A1 | 10/2002 | Piltingsrud | |
| 2003/0024274 A1 | 2/2003 | Cho et al. | |
| 2003/0057183 A1 | 3/2003 | Cho et al. | |
| 2003/0077453 A1 | 4/2003 | Oaku et al. | |
| 2003/0223139 A1* | 12/2003 | Paterek | C03C 27/042 359/894 |
| 2003/0234771 A1 | 12/2003 | Mulligan et al. | |
| 2004/0051944 A1 | 3/2004 | Stark | |
| 2004/0119701 A1 | 6/2004 | Mulligan et al. | |
| 2004/0137828 A1 | 7/2004 | Takahashi et al. | |
| 2004/0142118 A1 | 7/2004 | Takechi | |
| 2004/0163414 A1 | 8/2004 | Eto et al. | |
| 2005/0058423 A1 | 3/2005 | Brinkmann et al. | |
| 2005/0105071 A1 | 5/2005 | Ishii | |
| 2005/0135724 A1 | 6/2005 | Helvajian et al. | |
| 2005/0174525 A1 | 8/2005 | Tsuboi | |
| 2005/0193772 A1 | 9/2005 | Davidson | |
| 2005/0245165 A1 | 11/2005 | Harada et al. | |
| 2005/0259438 A1 | 11/2005 | Mizutani | |
| 2005/0285991 A1 | 12/2005 | Yamazaki | |

(56) References Cited

U.S. PATENT DOCUMENTS

| | | |
|---|---|---|
| 2006/0026521 A1 | 2/2006 | Hotelling et al. |
| 2006/0055936 A1 | 3/2006 | Yun et al. |
| 2006/0063351 A1 | 3/2006 | Jain |
| 2006/0070694 A1 | 4/2006 | Rehfeld et al. |
| 2006/0097991 A1 | 5/2006 | Hotelling et al. |
| 2006/0197753 A1 | 9/2006 | Hotelling et al. |
| 2006/0227331 A1 | 10/2006 | Wollmer et al. |
| 2006/0238695 A1 | 10/2006 | Miyamoto |
| 2006/0250559 A1 | 11/2006 | Bocko et al. |
| 2006/0268528 A1 | 11/2006 | Zadesky et al. |
| 2006/0292822 A1 | 12/2006 | Xie |
| 2006/0294420 A1 | 12/2006 | Schneider |
| 2007/0003796 A1 | 1/2007 | Isono et al. |
| 2007/0013822 A1 | 1/2007 | Kawata et al. |
| 2007/0029519 A1 | 2/2007 | Kikuyama et al. |
| 2007/0030436 A1 | 2/2007 | Sasabayashi |
| 2007/0039353 A1 | 2/2007 | Kamiya |
| 2007/0046200 A1 | 3/2007 | Fu et al. |
| 2007/0063876 A1 | 3/2007 | Wong |
| 2007/0089827 A1 | 4/2007 | Funatsu |
| 2007/0122542 A1 | 5/2007 | Halsey et al. |
| 2007/0132737 A1 | 6/2007 | Mulligan et al. |
| 2007/0196578 A1 | 8/2007 | Karp et al. |
| 2007/0236618 A1 | 10/2007 | Maag et al. |
| 2008/0020919 A1 | 1/2008 | Murata |
| 2008/0026260 A1 | 1/2008 | Kawai |
| 2008/0074028 A1 | 3/2008 | Ozolins et al. |
| 2008/0094716 A1 | 4/2008 | Ushiro et al. |
| 2008/0135175 A1 | 6/2008 | Higuchi |
| 2008/0158181 A1 | 7/2008 | Hamblin et al. |
| 2008/0202167 A1 | 8/2008 | Cavallaro et al. |
| 2008/0230177 A1 | 9/2008 | Crouser et al. |
| 2008/0243321 A1 | 10/2008 | Walser et al. |
| 2008/0261057 A1 | 10/2008 | Slobodin |
| 2008/0264176 A1 | 10/2008 | Bertrand et al. |
| 2008/0286548 A1 | 11/2008 | Ellison et al. |
| 2009/0046240 A1 | 2/2009 | Bolton |
| 2009/0067141 A1 | 3/2009 | Dabov et al. |
| 2009/0091551 A1 | 4/2009 | Hotelling et al. |
| 2009/0096937 A1 | 4/2009 | Bauer et al. |
| 2009/0153729 A1 | 6/2009 | Hiltunen et al. |
| 2009/0162703 A1 | 6/2009 | Kawai |
| 2009/0197048 A1 | 8/2009 | Amin et al. |
| 2009/0202808 A1 | 8/2009 | Glaesemann et al. |
| 2009/0220761 A1 | 9/2009 | Dejneka et al. |
| 2009/0246517 A1* | 10/2009 | Hatta |
| 2009/0257189 A1 | 10/2009 | Wang et al. |
| 2009/0324899 A1 | 12/2009 | Feinstein et al. |
| 2009/0324939 A1 | 12/2009 | Feinstein et al. |
| 2010/0009154 A1 | 1/2010 | Allan et al. |
| 2010/0024484 A1 | 2/2010 | Kashima |
| 2010/0028607 A1 | 2/2010 | Lee et al. |
| 2010/0035038 A1* | 2/2010 | Barefoot et al. |
| 2010/0053632 A1 | 3/2010 | Alphonse et al. |
| 2010/0062284 A1 | 3/2010 | Watanabe et al. |
| 2010/0119846 A1 | 5/2010 | Sawada |
| 2010/0137031 A1 | 6/2010 | Griffin et al. |
| 2010/0154992 A1 | 6/2010 | Feinstein et al. |
| 2010/0167059 A1 | 7/2010 | Hasimoto et al. |
| 2010/0171920 A1 | 7/2010 | Nishiyama |
| 2010/0179044 A1 | 7/2010 | Sellier et al. |
| 2010/0206008 A1 | 8/2010 | Harvey et al. |
| 2010/0215862 A1 | 8/2010 | Gomez et al. |
| 2010/0216514 A1 | 8/2010 | Smoyer et al. |
| 2010/0224767 A1 | 9/2010 | Kawano et al. |
| 2010/0265188 A1 | 10/2010 | Chang et al. |
| 2010/0279067 A1 | 11/2010 | Sabia et al. |
| 2010/0285275 A1 | 11/2010 | Baca et al. |
| 2010/0296027 A1 | 11/2010 | Matsuhira et al. |
| 2010/0315570 A1 | 12/2010 | Mathew et al. |
| 2010/0321305 A1 | 12/2010 | Chang et al. |
| 2011/0003619 A1 | 1/2011 | Fujii |
| 2011/0012873 A1 | 1/2011 | Prest |
| 2011/0019123 A1 | 1/2011 | Prest et al. |
| 2011/0019354 A1 | 1/2011 | Prest et al. |
| 2011/0030209 A1 | 2/2011 | Chang et al. |
| 2011/0050657 A1 | 3/2011 | Yamada |
| 2011/0063550 A1 | 3/2011 | Gettemy et al. |
| 2011/0067447 A1 | 3/2011 | Prest et al. |
| 2011/0072856 A1 | 3/2011 | Davidson et al. |
| 2011/0102346 A1 | 5/2011 | Orsley et al. |
| 2011/0159321 A1 | 6/2011 | Eda et al. |
| 2011/0164372 A1 | 7/2011 | McClure et al. |
| 2011/0182084 A1 | 7/2011 | Tomlinson |
| 2011/0186345 A1 | 8/2011 | Pakula et al. |
| 2011/0188846 A1 | 8/2011 | Sorg |
| 2011/0199687 A1 | 8/2011 | Sellier et al. |
| 2011/0248152 A1 | 10/2011 | Svajda et al. |
| 2011/0255000 A1* | 10/2011 | Weber et al. |
| 2011/0255250 A1 | 10/2011 | Dinh |
| 2011/0267833 A1 | 11/2011 | Verrat-Debailleul et al. |
| 2011/0279383 A1 | 11/2011 | Wilson et al. |
| 2011/0300908 A1 | 12/2011 | Grespan et al. |
| 2012/0018323 A1 | 1/2012 | Johnson et al. |
| 2012/0027399 A1 | 2/2012 | Yeates |
| 2012/0099113 A1 | 4/2012 | de Boer et al. |
| 2012/0105400 A1 | 5/2012 | Mathew et al. |
| 2012/0118628 A1 | 5/2012 | Pakula et al. |
| 2012/0135195 A1 | 5/2012 | Glaesemann et al. |
| 2012/0136259 A1 | 5/2012 | Milner et al. |
| 2012/0151760 A1* | 6/2012 | Steijner |
| 2012/0188743 A1 | 7/2012 | Wilson et al. |
| 2012/0196071 A1 | 8/2012 | Cornejo et al. |
| 2012/0202040 A1 | 8/2012 | Barefoot et al. |
| 2012/0236477 A1 | 9/2012 | Weber et al. |
| 2012/0236526 A1 | 9/2012 | Weber et al. |
| 2012/0281381 A1 | 11/2012 | Sanford |
| 2012/0328843 A1 | 12/2012 | Cleary et al. |
| 2013/0071601 A1 | 3/2013 | Bibl et al. |
| 2013/0083506 A1 | 4/2013 | Wright |
| 2013/0182259 A1 | 7/2013 | Brezinski et al. |
| 2013/0213565 A1 | 8/2013 | Lee et al. |
| 2014/0176779 A1 | 6/2014 | Weber et al. |

FOREIGN PATENT DOCUMENTS

| | | |
|---|---|---|
| CN | 1369449 | 9/2002 |
| CN | 1694589 | 11/2005 |
| CN | 101025502 | 8/2007 |
| CN | 101206314 | 6/2008 |
| CN | 101523275 | 2/2009 |
| CN | 101465892 | 6/2009 |
| CN | 102117104 | 7/2011 |
| CN | 102131357 | 7/2011 |
| CN | 101267509 | 8/2011 |
| CN | 1322339 | 11/2011 |
| CN | 202799425 | 3/2013 |
| CN | 103958423 | 7/2014 |
| DE | 1496586 | 6/1969 |
| DE | 1771268 | 12/1971 |
| DE | 3212612 | 10/1983 |
| DE | 10322350 | 12/2004 |
| EP | 1038663 | 9/2000 |
| EP | 1206422 | 11/2002 |
| EP | 1592073 | 11/2005 |
| EP | 1593658 | 11/2005 |
| EP | 2025556 | 2/2009 |
| EP | 2036867 | 3/2009 |
| EP | 2075237 | 7/2009 |
| EP | 2196870 | 6/2010 |
| EP | 2233447 | 9/2010 |
| EP | 2483216 | 8/2012 |
| EP | 2635540 | 9/2013 |
| FR | 2797627 | 2/2001 |
| FR | 2801302 | 5/2001 |
| GB | 1346747 | 2/1974 |
| JP | H42011599 | 6/1963 |
| JP | H48006925 | 3/1973 |
| JP | H55031944 | 3/1980 |
| JP | H55067529 | 5/1980 |
| JP | H55095645 | 7/1980 |
| JP | H55136979 | 10/1980 |
| JP | H55144450 | 11/1980 |
| JP | H59013638 | 1/1984 |

(56) References Cited

FOREIGN PATENT DOCUMENTS

| | | |
|---|---|---|
| JP | H59037451 | 2/1984 |
| JP | H61097147 | 5/1986 |
| JP | H60066696 | 10/1986 |
| JP | S63106617 | 2/1988 |
| JP | H63060129 | 3/1988 |
| JP | H63222234 | 9/1988 |
| JP | H05032431 | 2/1993 |
| JP | S52049422 | 9/1993 |
| JP | S62042260 | 9/1994 |
| JP | H07050144 | 2/1995 |
| JP | H08274054 | 10/1996 |
| JP | H09073072 | 3/1997 |
| JP | S52031757 | 3/1997 |
| JP | H09507206 | 7/1997 |
| JP | H09312245 | 12/1997 |
| JP | H11281501 | 10/1999 |
| JP | 2000086261 | 3/2000 |
| JP | 2000163031 | 6/2000 |
| JP | 2002003895 | 7/2000 |
| JP | 2000348338 | 12/2000 |
| JP | 2001083887 | 3/2001 |
| JP | 2002160932 | 6/2002 |
| JP | 2002338283 | 11/2002 |
| JP | 2002342033 | 11/2002 |
| JP | 2003502257 | 1/2003 |
| JP | 2003146705 | 5/2003 |
| JP | 2004094256 | 3/2004 |
| JP | 2004259402 | 9/2004 |
| JP | 2004292247 | 10/2004 |
| JP | 2004339019 | 12/2004 |
| JP | 2005140901 | 6/2005 |
| JP | 2005156766 | 6/2005 |
| JP | 2005162549 | 6/2005 |
| JP | 2005353592 | 12/2005 |
| JP | 2007099557 | 4/2007 |
| JP | 2007170958 | 7/2007 |
| JP | 2008001590 | 1/2008 |
| JP | 2008007360 | 1/2008 |
| JP | 2008063166 | 3/2008 |
| JP | 2008066126 | 3/2008 |
| JP | 2008192194 | 8/2008 |
| JP | 2008195602 | 8/2008 |
| JP | 2008216938 | 9/2008 |
| JP | 2008306149 | 12/2008 |
| JP | 2009167086 | 7/2009 |
| JP | 2009230341 | 10/2009 |
| JP | 2009234856 | 10/2009 |
| JP | 2010060908 | 3/2010 |
| JP | 2010064943 | 3/2010 |
| JP | 2010116276 | 5/2010 |
| JP | U3162733 | 8/2010 |
| JP | 2010195600 | 9/2010 |
| JP | 2010237493 | 10/2010 |
| JP | 2011032124 | 2/2011 |
| JP | 2011032140 | 2/2011 |
| JP | 2011158799 | 8/2011 |
| JP | 2011231009 | 11/2011 |
| JP | 2011527661 | 11/2011 |
| JP | 2013537723 | 10/2013 |
| KR | 102006005920 | 1/2006 |
| KR | 20100015492 | 2/2010 |
| KR | 102010019526 | 2/2010 |
| KR | 20110024485 | 3/2011 |
| KR | 102011030919 | 3/2011 |
| TW | 201007521 | 2/2010 |
| TW | 201235744 | 9/2012 |
| WO | WO 00/47529 | 8/2000 |
| WO | WO 02/42838 | 5/2002 |
| WO | WO 2004/014109 | 2/2004 |
| WO | WO 2004/061806 | 7/2004 |
| WO | WO 2004/106253 | 12/2004 |
| WO | WO 2007/089054 | 8/2007 |
| WO | WO 2008/044694 | 4/2008 |
| WO | WO 2008/143999 | 11/2008 |
| WO | WO 2009/003029 | 12/2008 |
| WO | WO 2009/078406 | 6/2009 |
| WO | WO 2009/099615 | 8/2009 |
| WO | WO 2009/102326 | 8/2009 |
| WO | WO 2009/125133 | 10/2009 |
| WO | WO 2010/005578 | 1/2010 |
| WO | WO 2010/014163 | 2/2010 |
| WO | WO 2010/019829 | 2/2010 |
| WO | WO 2010/027565 | 2/2010 |
| WO | WO 2010/080988 | 7/2010 |
| WO | WO 2010/101961 | 9/2010 |
| WO | WO 2011/008433 | 1/2011 |
| WO | WO 2011/041484 | 4/2011 |
| WO | WO 2012/015960 | 2/2012 |
| WO | WO 2012/027220 | 3/2012 |
| WO | WO 2012/106280 | 8/2012 |
| WO | WO 2013/106242 | 7/2013 |

OTHER PUBLICATIONS

Aben, "Laboratory of Photoelasticity," Institute of Cybernetics at TTU, www.ioc.ee/res/photo.html, Oct. 5, 2000.

Author Unknown, Chemically Strengthened Glass, Wikipedia, http://en/wikipedia.org/w/index.php?title=Chemically.sub.--strengthened.s- ub.--glass&oldid=284794988, Apr. 19, 2009.

Author Unknown, "Toward Making Smart Phone Touch-Screens More Glare and Smudge Resistant", e! Science News, http://eciencenews.com/articles/2009/08/19toward.making.smart.phone.touch-.screens.more.glare.and.smudge.resistant, 1 page, at least as early as Oct. 31, 2011.

Author Unknown, Wikipedia: "Iphone 4", www.wikipedia.org, 15 pages, at least as early as Oct. 31, 2011.

Author Unknown, Wikipedia: "Iphone 4", www.wikipedia.org, 17 pages, at least as early as Jan. 4, 2012.

Forooghian et al., "Investigative Ophthalmology & Visual Science," vol. 49, No. 10, Oct. 2008.

Karlsson et al., "The Technology of Chemical Glass Strengthening—a review," Glass Technology, European Journal of Glass Science and Technology A., vol. 51, No. 2, pp. 41-54, Apr. 2010.

Lee et al., "A Multi-Touch Three Dimensional Touch-Sensitive Tablet," Proceedings of CHI: ACM Conference on Human Factors in Computing Systems, pp. 21-25, Apr. 1985.

Mehrl et al., "Designer's Noticebook: Proximity Detection IR LED and Optical Crosstalk," http://ams.com/eng/content/view/download/145137, 5 pages, Aug. 1, 2011.

Ohkuma, "Development of a Manufacturing Process of a Thin, Lightweight LCD Cell," Department of Cell Process Development, IBM, Japan, Section 13.4., at least as early as Oct. 31, 2011.

Rubin, "The Automatic Recognition of Gestures," CMU-CS-91-202, Submitted in Partial Fulfillment of the Requirements of the Degree of Doctor of Philosophy in Computer Science at Carnegie Mellon University, 285 pages, Dec. 1991.

Rubin, "Combining Gestures and Direct Manipulation," CHI'92, pp. 659-660, May 1992.

Saxer et al., "High-Speed Fiber-Based Polarization—sensitive optical coherence tomography of in vivo human skin," Optics Letters, vol. 25, No. 18, pp. 1355-1357, Sep. 15, 2000.

Varshneya, "Chemical Strengthening of Glass: Lessons Learned and Yet to be Learned," International Journal of Applied Glass Science, vol. 1, No. 2, pp. 131-142, 2010.

Westerman, "Hand Tracking, Finger Identification and Chronic Manipulation of a Multi-Touch Surface," A Dissertation Submitted to the Faculty of the University of Delaware in Partial Fulfillment of the Requirements for the degree of Doctor of Philosophy in Electrical Engineering, 364 pages, Spring 1999.

Kingery et al., "Introduction to Ceramics," $2^{nd}$ Edition, John Wiley & Sons, pp. 792 and 833-844, 1976.

\* cited by examiner

FUSED OPAQUE AND CLEAR GLASS FOR CAMERA OR DISPLAY WINDOW

CROSS-REFERENCE TO RELATED APPLICATION

This application is a continuation patent application of U.S. patent application Ser. No. 13/492,620, filed Jun. 8, 2012 and titled "Fused Opaque and Clear Glass for Camera or Display Window," which is a continuation-in-part of U.S. patent application Ser. No. 13/347,430, filed Jan. 10, 2012 and titled "Integrated Camera Window," now U.S. Pat. No. 8,684,613, the disclosures of which are hereby incorporated herein by reference in their entireties.

BACKGROUND OF THE INVENTION

The present invention relates generally to processing glass. More particularly, the present invention relates to processing cover glass used in portable electronic devices.

Glass surfaces have become increasingly popular for use in consumer electronic products, such as handheld electronic devices. Since such devices often include displays, glass surfaces can be used as protective outer surfaces for such displays. Although plastic may be used instead of glass, glass tends to provide a better protective barrier given its strength and scratch resistance.

Further, rapid improvements in size and cost of digital camera technology have lead to integration of one or more digital cameras into various portable electronic devices. While such integration provides convenience in having camera functionality available, often quality of images or video captured by such integrated cameras suffers. Moreover, although images or video of dark scenes could benefit from a flash or other illumination, for various reasons including integration difficulties, flash or other illumination are often omitted from portable electronic devices.

Thus, in electronic devices there is a continuing need for improved approaches for camera integration with glass cover arrangements.

SUMMARY

Apparatus, systems and methods for windows integration with cover glass and for processing cover glass to provide windows for electronic devices are disclosed. Transparent windows such as a transparent camera window, a transparent illuminator window and/or a transparent display window can be integrated into the cover glass. The apparatus, systems and methods are especially suitable for cover glasses, or displays (e.g., LCD displays), assembled in small form factor electronic devices such as handheld electronic devices (e.g., mobile phones, media players, personal digital assistants, remote controls, etc.). The apparatus, systems and methods can also be used for cover glasses or displays for other relatively larger form factor electronic devices (e.g., portable computers, tablet computers, displays, monitors, televisions, etc.).

The invention can be implemented in numerous ways, including as a method, system, device or apparatus. Several embodiments of the invention are discussed below.

As a method for assembling an electronic product, one embodiment includes at least the acts of: providing a cover glass having at least a portion that is dark or opaque, forming a first aperture in the dark or opaque portion of the cover glass, and disposing a transparent camera window in the first aperture of the dark or opaque portion of the cover glass. Additionally, if desired, the method can further include the act of subsequently attaching the cover glass to a housing for the electronic product.

As another method for assembling an electronic product, one embodiment includes at least the acts of: providing a ceramic cover having at least a portion that is dark or opaque, forming a first aperture in the dark or opaque portion of the ceramic cover, and disposing a transparent camera window in the first aperture of the dark or opaque portion of ceramic cover. Additionally, if desired, the method can further include the act of subsequently attaching the cover glass to a housing for the electronic product.

As a consumer electronic product, one embodiment can include at least a transparent camera window, a cover formed of glass or ceramic, the cover being integrated with the transparent camera window, wherein the glass or ceramic cover has a substantially smooth exterior surface even across the transparent camera window, a housing coupled with the glass or ceramic cover, and electrical components disposed at least partially internal to the housing, the electrical components including at least a camera.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

It should be noted that FIGS. 1-9 are not necessarily drawn to scale. Instead, these figures are enlarged so that features are more readily visible.

DETAILED DESCRIPTION OF EMBODIMENTS OF THE INVENTION

Apparatus, systems and methods for windows integration with cover glass and for processing cover glass to provide windows for electronic devices are disclosed. Transparent windows such as a transparent camera window, a transparent illuminator window and/or a transparent display window can be integrated into the cover glass. The apparatus, systems and methods are especially suitable for cover glasses, or displays (e.g., LCD displays), assembled in small form factor electronic devices such as handheld electronic devices (e.g., mobile phones, media players, personal digital assistants, remote controls, etc.). The apparatus, systems and methods can also be used for cover glasses or displays for other relatively larger form factor electronic devices (e.g., portable computers, tablet computers, displays, monitors, televisions, etc.).

Since handheld electronic devices and portable electronic devices are mobile, they are potentially subjected to various different impact events and stresses that stationary devices are not subjected to. As such, the invention is well suited for implementation of displays for handheld electronic device or a portable electronic device that are designed to be thin.

Embodiments of the invention are discussed below with reference to FIGS. 1A-9. However, those skilled in the art will readily appreciate that the detailed description given herein with respect to these figures is for explanatory purposes as the invention extends beyond these limited embodiments.

FIGS. 1A-1D show views of one or more embodiments of a consumer electronic product. Electronic device 100 may, for example, be embodied as a portable or handheld electronic device having a thin form factor (or low profile). The electronic device 100 can, for example, correspond to a media player, a media storage device, a Portable Digital Assistant (PDA), a tablet PCs, a computer, a cellular phone, a smart phone, a GPS unit, a remote control, and the like.

Figure 1A:
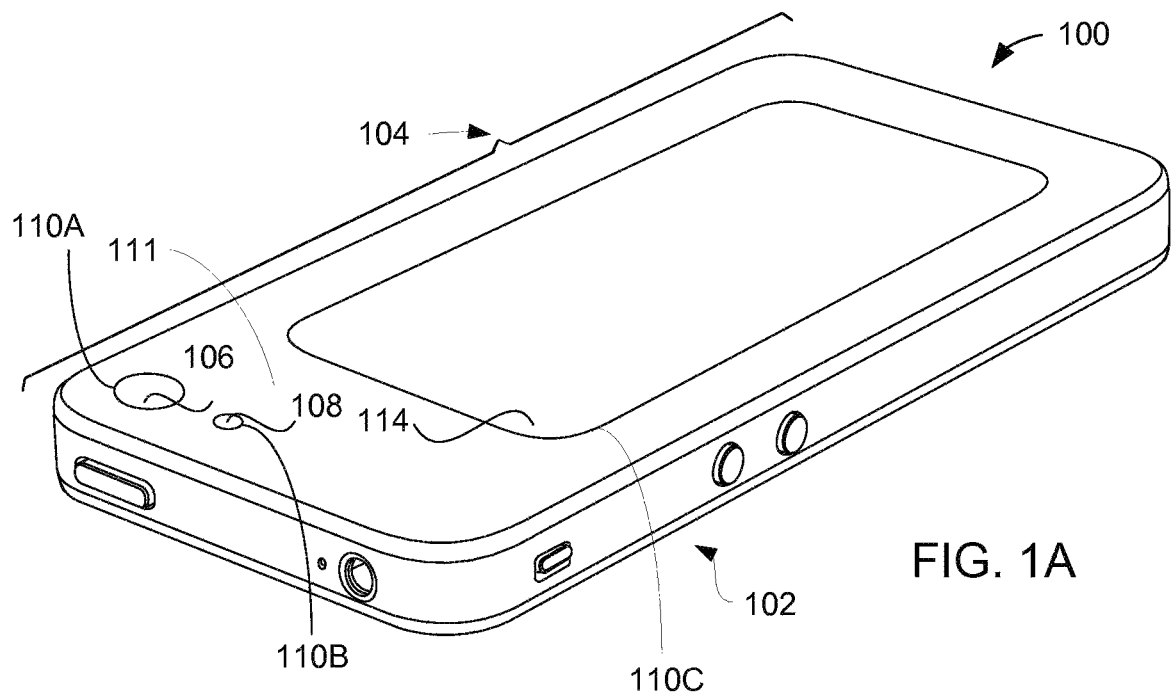
FIGS. 1A-1D show views of one or more embodiments of a consumer electronic product.
Figure 1B:
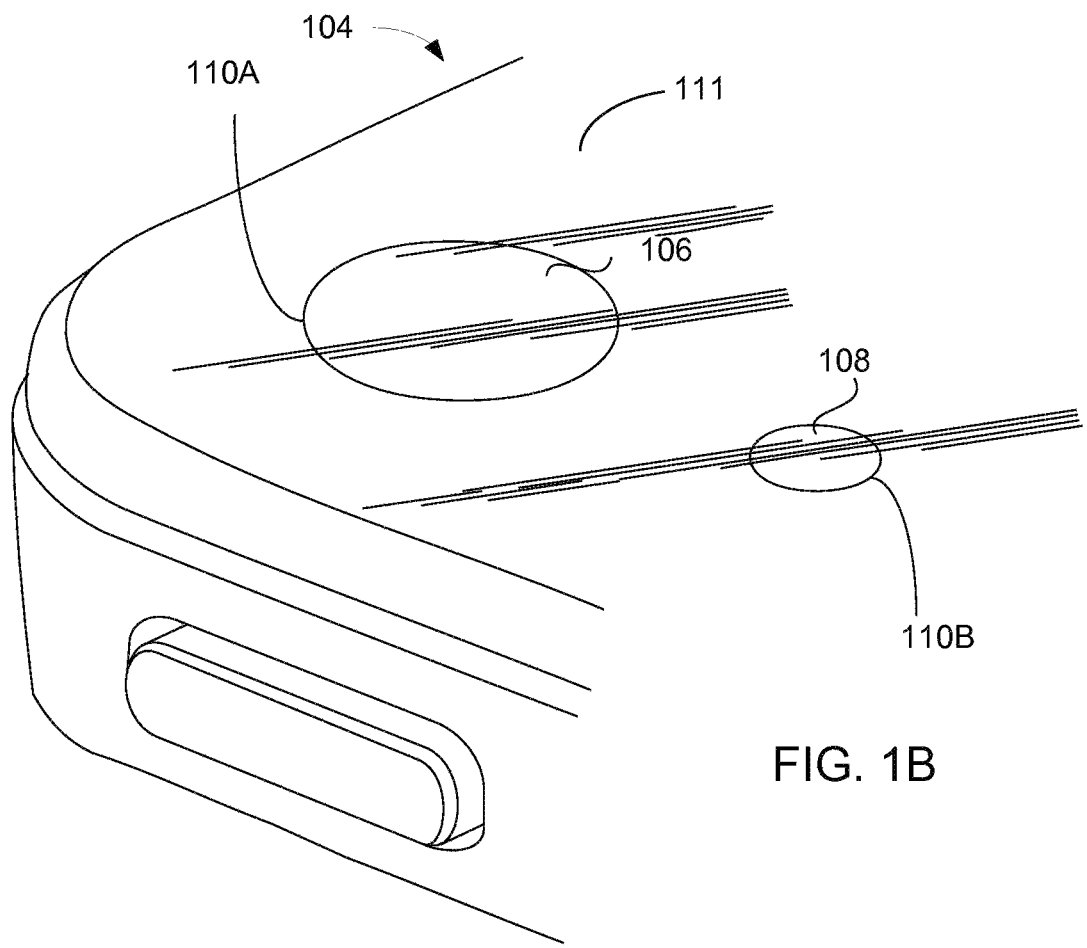

FIG. 1A shows a perspective view of electronic device 100 according to one embodiment. FIG. 1B shows a detailed perspective view of a corner portion of the electronic device 100. The electronic device 100 may include a housing 102 that serves as part of an outer surface for the electronic device 100. Electrical components (not shown in FIGS. 1A and 1B) may be disposed within the housing 102. The electrical components may include, but are not limited to, a controller (or processor), memory, battery, display, camera, and illuminator such as a flash.

Additionally, glass or ceramic may be used in covering front and/or back surfaces of the electronic device 100. For example, the electronic device 100 may have at least one cover glass 104 or may have at least one ceramic cover 104. Accordingly, in some embodiments cover glass 104 may comprise glass material, while in other embodiments ceramic cover 104 may comprise ceramic material and may be used in place of cover glass 104.

The cover glass 104 (or ceramic cover 104) may serve as an external surface, i.e., front or back surface, for the electronic device 100. The cover glass 104 (or ceramic cover 104) may also resist scratching and therefore may provide a substantially scratch-resistance surface for the front or back surface of the housing 102 for the electronic device 100. The cover glass 104 (or ceramic cover 104) may be coupled to the housing 102, for example, using an adhesive and/or mechanical means.

The cover glass 104 (or ceramic cover 104) may be provided over a camera area. The cover glass 104 (or ceramic cover 104) may comprise a transparent camera window 106 at or adjacent the camera area. In one example, the camera area may comprise at least a camera such as a digital camera for capturing images or video. At or adjacent the camera area, the transparent camera window 106 of the cover glass 104 (or ceramic cover 104) may be substantially transparent to the camera, for capturing images or video through the cover glass 104 (or ceramic cover 104).

The camera area may extend within the housing 102 of the electronic device 100. A first minority region of cover glass 104 (or ceramic cover 104) adjacent to the camera may extend over the camera area. The first minority region of cover glass 104 (or ceramic cover 104) adjacent to the camera may comprise the transparent camera window 106. The cover glass 104 (or ceramic cover 104), and more particularly the transparent camera window 106 can substantially overlap the camera. In one embodiment, a peripheral region of the cover glass 104 or ceramic cover 104 (more particularly the transparent camera window 106) may be adjacent to the camera and may extend over the camera area.

Similarly, the cover glass 104 (or ceramic cover 104) may be provided over an illuminator area. The cover glass 104 (or ceramic cover 104) may comprise a transparent illuminator window 108 at or adjacent the illuminator area. In one example, the illuminator area may comprise at least an illuminator such as a light emitting diode (LED) or electronic flash tube for illuminating dark scenes. At or adjacent the illuminator area, the transparent illuminator window 108 of the cover glass 104 (or ceramic cover 104) may be substantially transparent to the illuminator. The transparent illuminator window 108 may be arranged so that illumination from the illuminator may project outwardly through the transparent illuminator window and outwardly from the cover glass 104 (or ceramic cover 104).

The illuminator area may extend within the housing 102 of the electronic device 100. A second minority region of cover glass 104 (or ceramic cover 104) adjacent to the illuminator may extend over the illuminator area. The second minority region of cover glass 104 (or ceramic cover 104) adjacent to the illuminator may comprise the transparent illuminator window 108. The cover glass 104 (or ceramic cover 104), and more particularly the transparent illuminator window 108 can substantially overlap the illuminator. In one embodiment, another peripheral region of the cover glass 104 or ceramic cover 104 (more particularly the transparent illuminator window 108) may be adjacent to the illuminator and may extend over the illuminator area.

Additionally, in some embodiments the cover glass 104 (or ceramic cover 104) may be provided over a display area. A transparent display window 114 of the cover glass 104 (or ceramic cover 104) may be arranged adjacent to the display area so that a display of the display area can be viewed through the transparent display window 114 of the cover glass 104 (or ceramic cover 104). In some embodiments, the display area may be disposed within the housing 102 of the electronic device 100. In some embodiments, the electronic device 100 may include a full view or substantially full view display area that consumes a majority of the front surface of the electronic device 100. The display area may be embodied in a variety of ways. In one example, the display area may cover at least the display, such as a flat panel display and more particularly an LCD display.

The display area may alternatively or additionally include a touch sensing device positioned over a display screen. For example, the display area may include one or more glass layers having capacitive sensing points distributed thereon. Each of these components may be separate layers or they may be integrated into one or more stacks. In one embodiment, the transparent display window 114 of the cover glass 104 (or ceramic cover 104) may act as the outer most layer of the display area.

In some embodiments, the electronic device 100 may include a display region (e.g., the display area) that includes various layers. The various layers may include at least the display, and may additionally include a sensing arrangement disposed over the display. In some cases, the layers may be stacked and adjacent one another, and may even be laminated thereby forming a single unit. In other cases, at least some of the layers are spatially separated and not directly adjacent.

For example, the sensing arrangement may be disposed above the display such that there is a gap therebetween. By way of example, the display may include a Liquid Crystal Display (LCD) that includes a Liquid Crystal Module (LCM). The LCM generally includes at least an upper glass sheet and a lower glass sheet that at least partially sandwich a liquid crystal layer therebetween. The sensing arrangement may be a touch sensing arrangement such as those used to create a touch screen.

For example, a capacitive sensing touch screen may include substantially transparent sensing points or nodes dispersed about the transparent display window 114 of the cover glass 104 (or ceramic cover 104). The transparent display window 114 of the cover glass 104 (or ceramic cover 104) may serve as an outer protective barrier for the display region. Typically, transparent display window 114 of the cover glass 104 (or ceramic cover 104) may be adjacent to the display region. However, the transparent display window 114 of the cover glass 104 (or ceramic cover 104) may also be integrated with the display region, such as another layer (outer protective layer) for the display region.

The cover glass 104 (or ceramic cover 104) may extend across the entire top surface of the housing 102. In such a case, the edges of the cover glass 104 (or ceramic cover 104) may be aligned, or substantially aligned, with the sides of the housing 102.

Given that the thickness of the cover glass 104 (or ceramic cover 104) may be rather thin (i.e., typically less than a few millimeters), the cover glass 104 (or ceramic cover 104) if not carefully arranged can be susceptible to cracking or breaking if a significant force is imposed thereon, such as by a drop event where the electronic device 100 is accidentally dropped.

In embodiments that employ cover glass 104, the glass material for the cover glass 104 may be selected from available glass that is stronger. For example, alumino silicate glass (e.g., DVTS from Corning) is one suitable choice for the glass material for the cover glass 104. Other examples of glass materials include, but are not limited to, soda lime, borosilicate, and the like. In other embodiments that employ ceramic cover 104 in place of cover glass 104, the ceramic material for the ceramic cover 104 may be selected from available ceramics that are stronger. For example, zirconia ceramics may be suitable choices for the ceramic material for the ceramic cover 104. Other examples of ceramic materials include, but are not limited to, alumina ceramics, and the like.

Transparent camera window 106 and/or transparent illuminator window 108 and/or transparent display window 114 can be integrated into the cover glass 104 (or ceramic cover 104). Transparent camera window 106 and/or transparent illuminator window and/or transparent display window 114 may comprise glass. However, in some embodiments, transparent camera window 106 and/or transparent illuminator window 108 and/or transparent display window 114 may comprise plastic.

The edges of the cover glass pieces (or in some embodiments, ceramic cover pieces) can be configured to correspond to a particular predetermined geometry. By machining the edges of the cover glass 104 (or ceramic cover 104) to correspond to the particular predetermined geometry, the cover glass 104 (or ceramic cover 104) can become stronger and thus less susceptible to damage.

Moreover, as will be discussed in greater detail subsequently herein, the cover glass 104 can be selectively chemically treated for further strengthening. One suitable chemical treatment is to selectively expose one or more surface portions of the cover glass in a chemical bath containing potassium (e.g., KNO3) for a period of time (e.g., several hours) at an elevated temperature. The selective chemical treatment can desirably result in higher compression stresses at the selectively exposed surface portions of the cover glass. The higher compression stresses may be the result of ion exchange wherein K+ ions effectively replacing some Na+ ions at or near the selectively exposed surface portions of the cover glass 104.

Similarly, some ceramics can be chemically strengthened. In embodiments using ceramic cover 104 in place of cover glass 104, if ceramic material of ceramic cover 104 can be chemically strengthened, then ceramic cover 104 may be chemically strengthened.

Furthermore, it should be understood that reducing veiling glare may improve quality of images or video captured by a camera through transparent camera window 106. The cover glass 104 can comprise transparent camera window 106 and the glass region proximate thereto is dark or opaque. The camera can be arranged adjacent to the transparent camera window 106. The glass region of the cover glass 104 proximate to the transparent camera window 106 can be sufficiently dark or opaque for substantially reducing veiling glare at the camera via the cover glass 104.

Similarly, in embodiments using ceramic cover 104 in place of cover glass 104, the ceramic cover 104 can comprise transparent camera window 106 and the ceramic region proximate thereto is dark or opaque. As just discussed, the camera can be arranged adjacent to the transparent camera window 106. The ceramic region of the ceramic cover 104 proximate to the transparent camera window 106 can be sufficiently dark or opaque for substantially reducing veiling glare at the camera via the ceramic cover 104.

Dark or opaque glass material of the cover glass 104 (or dark or opaque ceramic material of the ceramic cover 104) may substantially reduce veiling glare, substantially inhibiting such diffuse stray light from reaching the image plane of the camera. Veiling glare might otherwise reduce contrast and resolution of images or video captured by the camera.

Dark or opaque glass material of the cover glass 104 (or dark or opaque ceramic material of the ceramic cover 104) may be sufficiently dark or opaque for providing substantial optical isolation of the transparent camera window 106 from the transparent illuminator window 108. Similarly, dark or opaque glass material of the cover glass 104 (or dark or opaque ceramic material of the ceramic cover 104) may be sufficiently dark or opaque for providing substantial optical isolation of the transparent camera window 106 from the transparent display window 114. The foregoing optical isolation may substantially reduce veiling glare from the illuminator and/or display at the camera.

For example, as illumination from the illuminator projects outwardly through the transparent illuminator window 108, some stray light rays from the illuminator may be substantially attenuated as they encounter dark or opaque glass material of the cover glass 104 (or dark or opaque ceramic material of the ceramic cover 104). Dark or opaque glass material of the cover glass 104 (or dark or opaque ceramic material of the ceramic cover 104) may be sufficiently dark or opaque for substantially attenuating stray light rays from the illuminator, which in turn may provide substantial optical isolation of the transparent camera window 106 from the transparent illuminator window 108. The foregoing may substantially reduce veiling glare from the illuminator at the camera.

Accordingly, it should be understood that dark or opaque glass material of the cover glass 104 (or dark or opaque ceramic material of the ceramic cover 104) may be disposed within the cover glass 104 (or within the ceramic cover 104) between the camera associated with transparent camera window 106 and the illuminator associated with transparent illuminator window 108. The dark or opaque glass material of the cover glass 104 (or dark or opaque ceramic material of the ceramic cover 104) may serve to substantially reduce light from the illuminator from coupling into the camera by way of the cover glass 104 (or ceramic cover 104). More specifically, dark or opaque glass material of the cover glass 104 (or dark or opaque ceramic material of the ceramic cover 104) may serve to substantially reduce veiling glare from the illuminator from coupling into the camera by way of the cover glass 104 (or ceramic cover 104).

As another example, as light from the display projects outwardly through the transparent display window 114, some stray light rays from the display may be substantially attenuated as they encounter dark or opaque glass material of the cover glass 104 (or dark or opaque ceramic material of the ceramic cover 104). Dark or opaque glass material of the cover glass 104 (or dark or opaque ceramic material of the ceramic cover 104) may be sufficiently dark or opaque for substantially attenuating stray light rays from the display, which in turn may provide substantial optical isolation of the transparent camera window 106 from the transparent display window 114. The foregoing may substantially reduce veiling glare from the display at the camera. In other words, the adjacent glass or ceramic region 111 of the cover glass 104 (or ceramic cover 104) may be sufficiently dark or opaque for substantially reducing veiling glare at the camera via the cover glass 104 (or ceramic cover 104.)

Accordingly, it should be understood that dark or opaque glass material of the cover glass 104 (or dark or opaque ceramic material of the ceramic cover 104) may be disposed within the cover glass 104 (or within the ceramic cover 104) between the camera associated with transparent camera window 106 and the display associated with transparent display window 114. The dark or opaque glass material of the cover glass 104 (or dark or opaque ceramic material of the ceramic cover 104) may serve to substantially reduce light from the display from coupling into the camera by way of the cover glass 104 (or ceramic cover 104). More specifically, dark or opaque glass material of the cover glass 104 (or dark or opaque ceramic material of the ceramic cover 104) may serve to substantially reduce the display's veiling glare from coupling into the camera by way of the cover glass 104 (or ceramic cover 104).

As shown by shading in the figures (and as particularly shown by shading in detailed view in FIG. 1B), the cover glass 104 (or ceramic cover 104) can have a substantially smooth exterior surface comprising the transparent camera window 106. The transparent camera window 106 may have a perimeter that is substantially encircled by a first bonding interface 110A for substantially securing the perimeter of the transparent camera window 106 to the cover glass 104 (or to the ceramic cover 104). The exterior surface of the cover glass 104 (or ceramic cover 104) can be lapped to be planar over the transparent camera window 106, the first bonding interface 110A and the adjacent region 111 of the cover glass 104 (or ceramic cover 104).

As discussed in greater detail subsequently herein, the first bonding interface 110A may comprise a fusion bond of glass material of the perimeter of the transparent camera window 106 to substantially similar or substantially different glass material of the cover glass 104. In embodiments where the ceramic cover 104 is used in place of the cover glass 104, the first bonding interface 110A may comprise a fusion bond of glass material of the perimeter of the transparent camera window 106 to ceramic material of the ceramic cover 104.

The camera can be arranged adjacent to the transparent camera window 106 and within the first bonding interface 110A. The first bonding interface 110A can be interposed within the cover glass 104 (or ceramic cover 104) between the camera and an adjacent region 111 of the cover glass 104 (or ceramic cover 104). More particularly, the first bonding interface 110A can be interposed within the cover glass 104 (or ceramic cover 104) between the transparent camera window 106 and an adjacent region 111 of the cover glass 104 (or ceramic cover 104).

Similarly, the transparent illuminator window 108 may have a perimeter that is substantially encircled by a second bonding interface 110B for substantially securing the perimeter of the transparent illuminator window 108 to the cover glass 104 (or to the ceramic cover 104). The exterior surface of the cover glass 104 (or ceramic cover 104) can be lapped to be planar over the transparent illuminator window 108, the second bonding interface 110B and the adjacent region 111 of the cover glass 104 (or ceramic cover 104). As discussed in greater detail subsequently herein, the second bonding interface 110B may comprise a fusion bond of glass material of the perimeter of the transparent illuminator window 108 to substantially similar or substantially different glass material of the cover glass 104. In embodiments where the ceramic cover 104 is used in place of the cover glass 104, the second bonding interface 110B may comprise a fusion bond of glass material of the perimeter of the transparent illuminator window 108 to ceramic material of the ceramic cover 104.

The illuminator can be arranged adjacent to the transparent illuminator window 108 and within the second bonding interface 110B. The second bonding interface 110B can be interposed within the cover glass 104 (or ceramic cover 104) between the illuminator and an adjacent region 111 of the cover glass 104 (or ceramic cover 104). More particularly, the second bonding interface 110B can be interposed within the cover glass 104 (or ceramic cover 104) between the transparent illuminator window 108 and an adjacent region 111 of the cover glass 104 (or ceramic cover 104).

Similarly, the transparent display window 114 may have a perimeter that is substantially encircled by a third bonding interface 110C for substantially securing the perimeter of the transparent display window 114 to the cover glass 104 (or to the ceramic cover 104). The exterior surface of the cover glass 104 (or ceramic cover 104) can be lapped to be planar over the transparent display window 114, the third bonding interface 110C and the adjacent region 111 of the cover glass 104 (or ceramic cover 104). As discussed in greater detail subsequently herein, the third bonding interface 110C may comprise a fusion bond of glass material of the perimeter of the transparent display window 114 to substantially similar or substantially different glass material of the cover glass 104. In embodiments where the ceramic cover 104 is used in place of the cover glass 104, the third bonding interface 110C may comprise a fusion bond of glass material of the perimeter of the transparent display window 114 to ceramic material of the ceramic cover 104.

The display can be arranged adjacent to the transparent display window 114 and within the third bonding interface 110C. The third bonding interface 110C can be interposed within the cover glass 104 (or ceramic cover 104) between the display and adjacent region 111 of the cover glass 104 (or ceramic cover 104). More particularly, the third bonding interface 110C can be interposed within the cover glass 104 (or ceramic cover 104) between the transparent display window 114 and adjacent region 111 of the cover glass 104 (or ceramic cover 104).

First bonding interface 110A and second bonding interface 110B and third boding interface 110C may be thin, and may be difficult to see with the unaided eye. For ease of illustration in the figures, visual depictions of first bonding interface 110A and second bonding interface 110B and third boding interfaced 110C are show as greatly exaggerated.

Figure 1C:
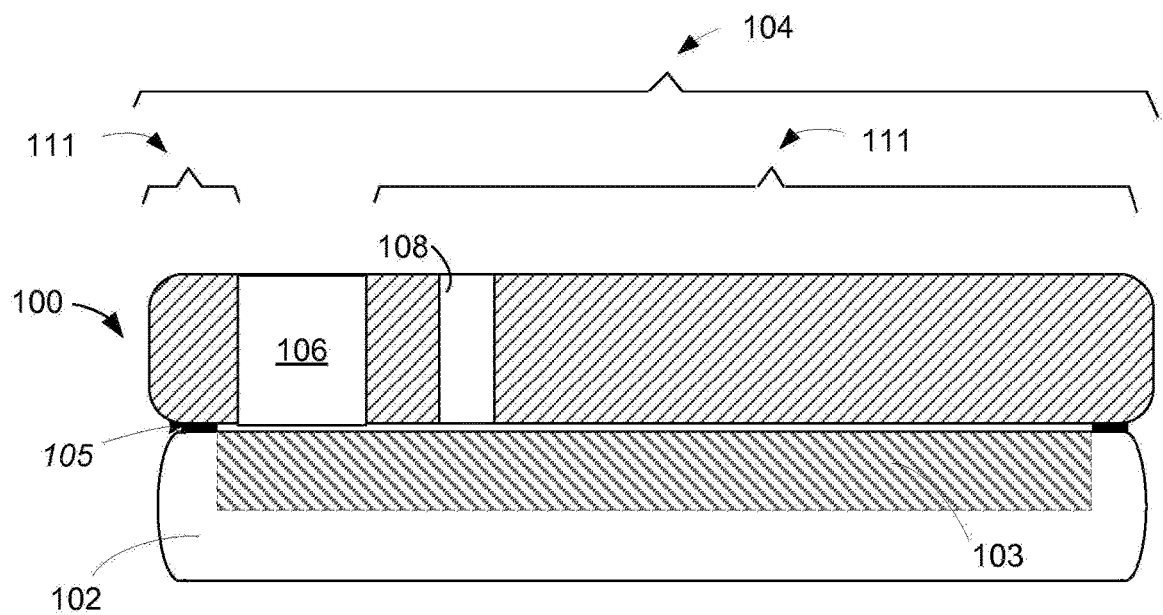

As shown in simplified cross sectional view in FIG. 1C, the electronic device 100 may include housing 102 (shown greatly simplified in FIG. 1C). Electrical components 103 may be disposed within housing 102. As mentioned previously herein the electrical components may include, but are not limited to, a controller (or processor), memory, battery, display, camera, and illuminator such as a flash. The cover glass 104 (or ceramic cover 104) may be coupled to the housing 102, for example, using adhesive 105. For ease of illustration, in cross sectional views relative thickness of cover glass 104 (or ceramic cover 104) is shown as greatly exaggerated. As shown in cross sectional view in FIG. 1C, the cover glass 104 (or ceramic cover 104) can have a substantially smooth exterior surface comprising the transparent camera window 106, substantially encircled by first bonding interface, and transparent illuminator window 108, substantially encircled by second bonding interface. The first bonding interface can be interposed within the cover glass 104 (or ceramic cover 104) between the transparent camera window 106 and adjacent region 111 of the cover glass.

Figure 1D:
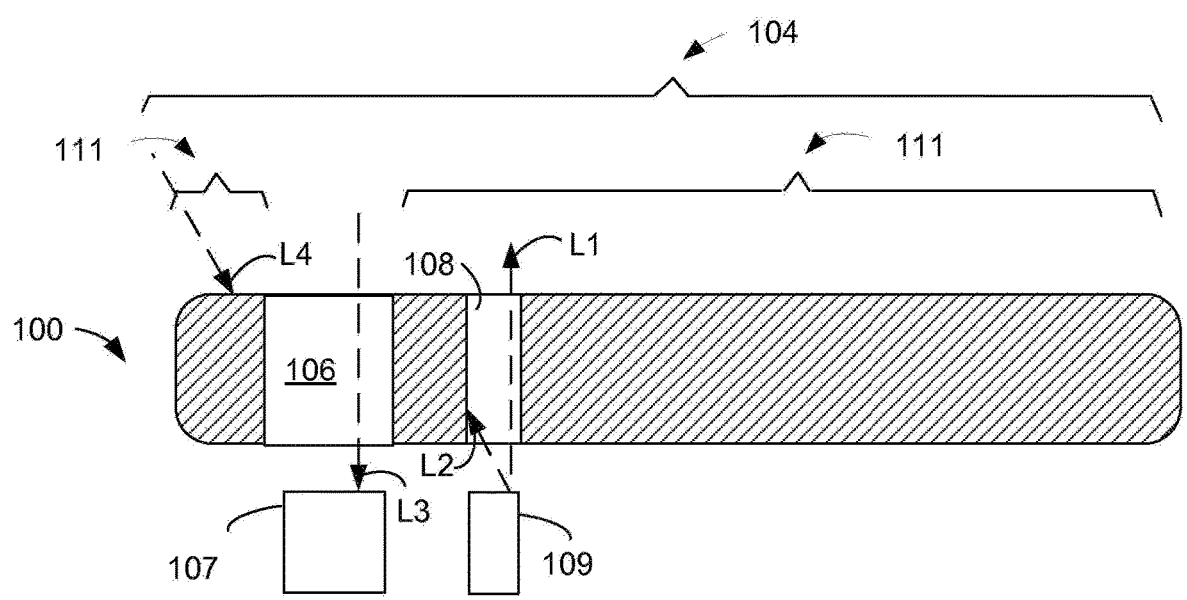

In FIG. 1D, a portion of the electronic device 100 is shown simplified in cross sectional view, so as to illustrate operation of dark or opaque glass material of the cover glass 104 (or dark or opaque ceramic material of the ceramic cover 104) in reducing veiling glare at camera 107 of the electronics of device 100. Dark or opaque glass material of the cover glass 104 (or dark or opaque ceramic material of the ceramic cover 104) may be sufficiently dark or opaque for providing substantial optical isolation of the transparent camera window 106 from the transparent illuminator window 108. This optical isolation may substantially reduce veiling glare from the illuminator at the camera. In FIG. 1D, notional dashed line arrows are used to depict light rays.

Illumination from the illuminator 109 is shown in FIG. 1D as projecting outwardly through the transparent illuminator window 108. This illumination L1 is depicted in FIG. 1D by notional dashed line arrow L1. As illumination L1 from the illuminator 109 projects outwardly through the transparent illuminator window 108, some stray light rays L2 from the illuminator (as depicted by notional dashed line arrow L2) may be substantially attenuated as they encounter dark or opaque glass material of the cover glass 104 (or dark or opaque ceramic material of the ceramic cover 104). That is, dark or opaque glass material of the cover glass 104 (or dark or opaque ceramic material of the ceramic cover 104) may be sufficiently dark or opaque for substantially attenuating stray light rays L2 from the illuminator (as depicted by notional dashed line arrow L2). This in turn may provide substantial optical isolation of the transparent camera window 106 from the transparent illuminator window 108. The foregoing may substantially reduce veiling glare from the illuminator 109 at the camera 107. Accordingly, dark or opaque glass material of the cover glass 104 (or dark or opaque ceramic material of the ceramic cover 104) is shown in FIG. 1D as substantially blocking the notional dashed line arrow L2, so as to depict such substantial reduction in veiling glare from illuminator 109.

Accordingly, dark or opaque glass material of the cover glass 104 (or dark or opaque ceramic material of the ceramic cover 104) may be disposed within the cover glass 104 (or within the ceramic cover 104) between the camera 107 associated with transparent camera window 106 and the illuminator 109 associated with transparent illuminator window 108. The dark or opaque glass material of the cover glass 104 (or dark or opaque ceramic material of the ceramic cover 104) may serve to substantially reduce stray light rays L2 from the illuminator from coupling into the camera by way of the cover glass 104 (or ceramic cover 104). More specifically, dark or opaque glass material of the cover glass 104 (or dark or opaque ceramic material of the ceramic cover 104) may serve to substantially reduce veiling glare from the illuminator 109 from coupling into the camera 107 by way of the cover glass 104 (or ceramic cover 104).

In other words, in FIG. 1D the cover glass 104 (or ceramic cover 104) can comprise transparent camera window 106 and an adjacent glass or ceramic region 111 that may be dark or opaque. The camera 107 can be arranged adjacent to the transparent camera window 106 so that the camera 107 to receive intended light rays L3 through transparent camera window 106. By receiving intended light rays L3 through transparent camera window 106, the camera 107 may capture images or video.

The adjacent glass or ceramic region 111 of the cover glass 104 (or ceramic cover 104) can be sufficiently dark or opaque for substantially reducing veiling glare at the camera 107 via the cover glass 104 (or ceramic cover 104.) Dark or opaque glass material of the cover glass 104 (or dark or opaque ceramic material of the ceramic cover 104) may substantially reduce veiling glare, substantially inhibiting such diffuse stray light from reaching the image plane of the camera. Such veiling glare might otherwise reduce contrast and resolution of images or video captured by the camera 107.

The illuminator 109 has already been discussed in detail as one possible source of veiling glare, which may arise from within the electronic device 100. As already discussed, some stray light rays L2 from the illuminator (as depicted by notional dashed line arrow L2) may be substantially attenuated as they encounter dark or opaque glass material of the cover glass 104 (or dark or opaque ceramic material of the ceramic cover 104). However, the display of the electronic device 100 may be another possible source of veiling glare, which may arise from within the electronic device 100. As already discussed, the adjacent glass or ceramic region 111 of the cover glass 104 (or ceramic cover 104) may be sufficiently dark or opaque for substantially attenuating stray light rays from the display, which in turn may provide substantial optical isolation of the transparent camera window 106 from the display via the transparent display window 114, and may provide substantial reduction in veiling glare at the camera 107 via the cover glass 104 (or ceramic cover 104.)

Further, there may also be other possible sources of veiling glare, which may arise from outside the electronic device 100. Additional stray light rays L4 are shown in FIG. 1D as arising from outside the electronic device (and are depicted in FIG. 1D by notional dashed line arrow L4). Such additional stray light rays L4 arising from outside the electronic device may be substantially attenuated and/or reduced as they encounter dark or opaque glass material of the cover glass 104 (or dark or opaque ceramic material of the ceramic cover 104). Accordingly, dark or opaque glass material of at least a portion of the cover glass 104 (or dark or opaque ceramic material of the ceramic cover 104) is shown in FIG. 1D as substantially blocking the notional dashed line arrow L4, so as to depict such substantial reduction in veiling glare arising from outside electronic device 100.

FIGS. 2A-4B show embodiments for processing glass material of cover glass or ceramic material of ceramic cover.

Figure 2A:
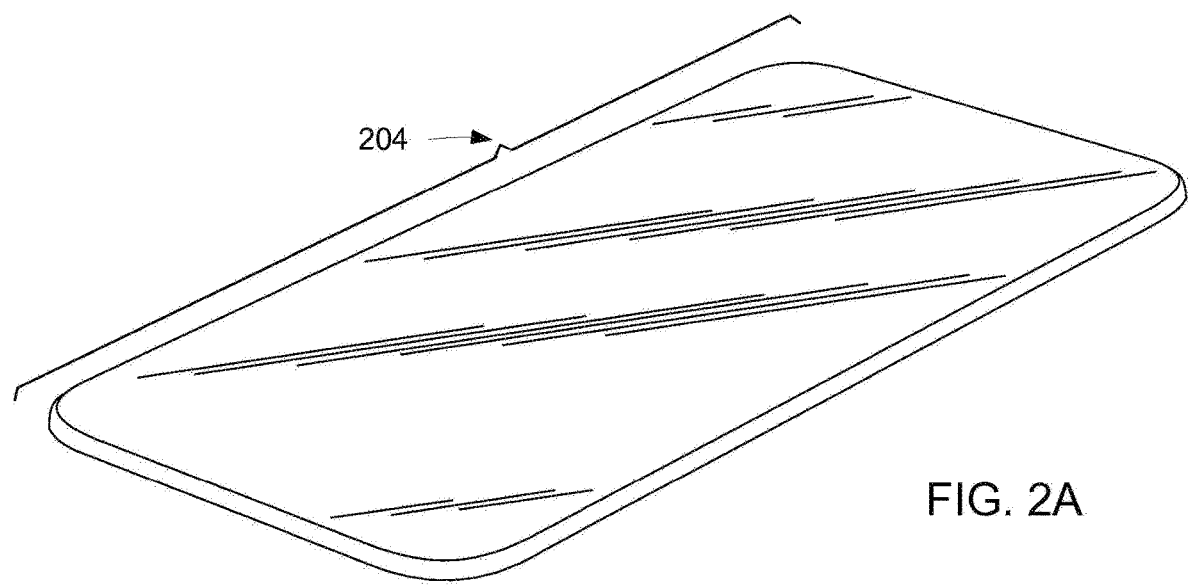
FIGS. 2A-4B show embodiments for processing glass material of cover glass or ceramic material of a ceramic cover.
Figure 2B:
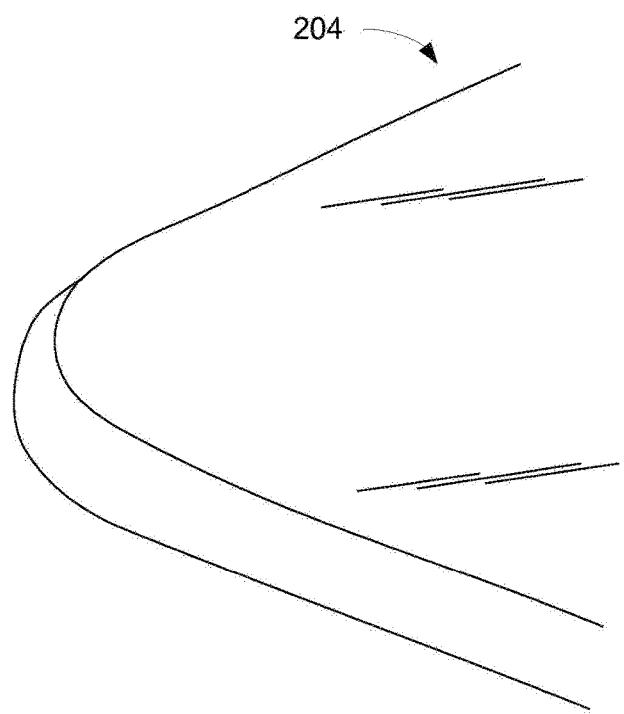

FIG. 2A shows a perspective view of cover glass 204, which may be singulated from sheet glass. In embodiments that process ceramic cover 204 in place of cover glass 204, the ceramic cover 204 may be singulated from ceramic sheet. FIG. 2B shows a detailed view of the peripheral region of cover glass 204 or ceramic cover 204.

Figure 3A:
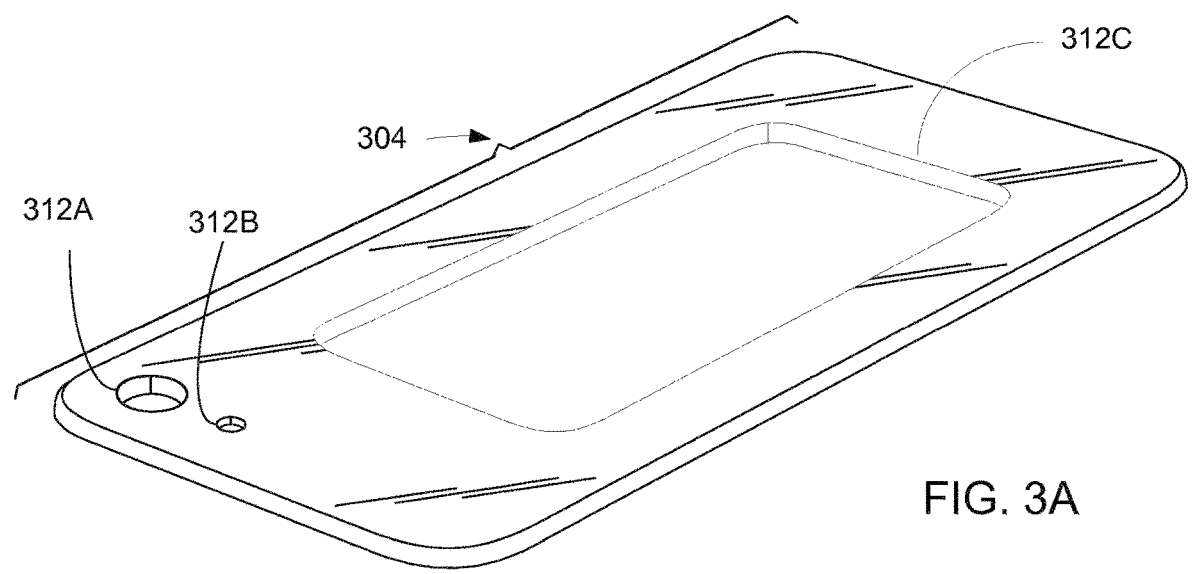
Figure 3B:
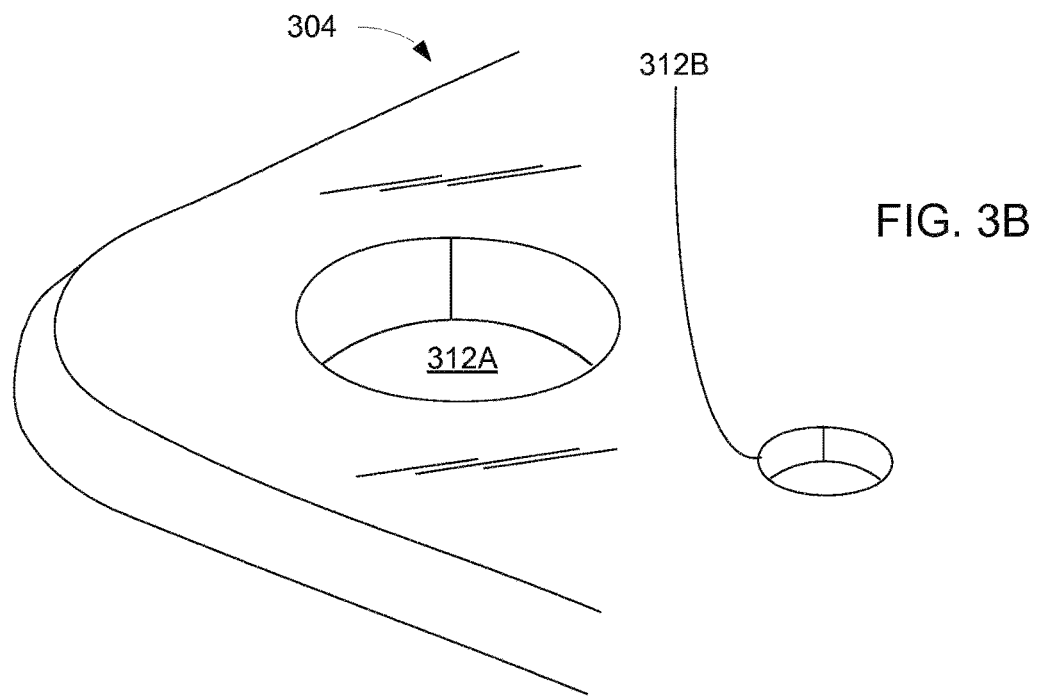

FIG. 3A shows a perspective view of processed cover glass 304 (or processed ceramic cover 304) after first, second and third apertures 312A, 312B, 312C have been formed in the cover glass 304 (or in ceramic cover 304.) The apertures 312A, 312B, 312C may be formed in various ways, for example by drilling, cutting, milling or other machining methods. FIG. 3B shows a detailed view of the peripheral region of processed cover glass 304 (or processed ceramic cover 304) with first and second apertures 312A, 312B.

Figure 4A:
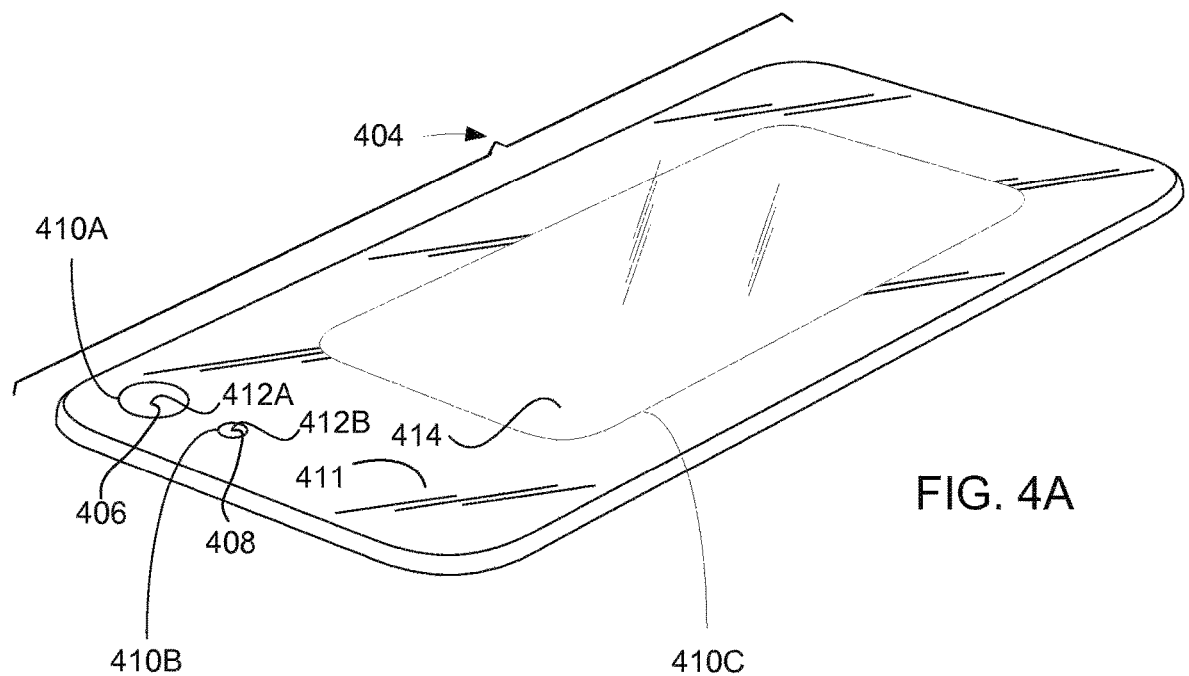
Figure 4B:
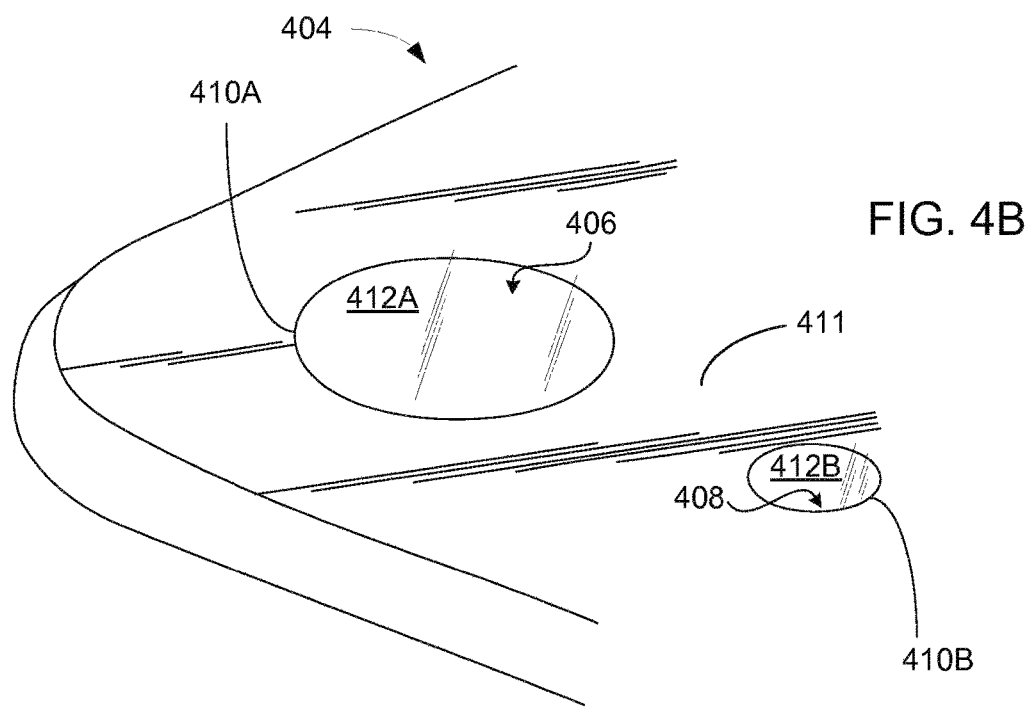

FIG. 4A shows a perspective view, and FIG. 4B shows a detailed view, of a further processed cover glass 404 (or further processed ceramic cover 404). As shown, transparent camera window 406 has been disposed in first aperture 412A, which may extend through the cover glass 404 (or through ceramic cover 404). Transparent illuminator window 408 has been disposed in second aperture 412B, which likewise may extend through the cover glass 404 (or through ceramic cover 404). Transparent display window 414 has also been disposed in third aperture 412C, which likewise may extend through the cover glass 404 (or through ceramic cover 404).

The transparent camera window 406, transparent illuminator window 408 and transparent display window 414 can be formed as suitably sized glass plugs, pegs or pieces, and may be hot pressed in place at a suitable temperature, for example approximately six hundred (600) to approximately seven hundred (700) degrees Celsius (° C.). Such heat may be applied for securing the transparent camera window 406, the transparent illuminator window 408 and the transparent display window 414 to the cover glass 404 (or to the ceramic cover 404).

As shown by shading in the figures (and as particularly shown by shading in detailed view in FIG. 4B), the cover glass 404 (or ceramic cover 104) can have a substantially smooth exterior surface comprising the transparent camera window 406. The transparent camera window 406 may have a perimeter that is substantially encircled by first bonding interface 410A for substantially securing the perimeter of the transparent camera window 406 to the cover glass 404 (or to the ceramic cover 404). The exterior surface of the cover glass 404 (or ceramic cover 404) and/or the transparent camera window 406 can be lapped to be planar over the transparent camera window 406, the first bonding interface 410A and the adjacent region 411 of the cover glass 404 (or ceramic cover 404).

The first bonding interface 410A may comprise a fusion bond of glass material of the perimeter of the transparent camera window 406 to substantially similar or substantially different glass material of the cover glass 404. Such fusion bond 410A may be formed by the heating discussed previously herein for securing the transparent camera window 406 to the cover glass 404.

In embodiments where the ceramic cover 404 is used in place of the cover glass 404, the first bonding interface 410A may comprise a fusion bond of glass material of the perimeter of the transparent camera window 406 to ceramic material of the ceramic cover 404. Such fusion bond 410A may be formed by the heating discussed previously herein for securing the transparent camera window 406 to the ceramic cover 404.

Similarly, the transparent illuminator window 408 may have a perimeter that is substantially encircled by a second bonding interface 410B for substantially securing the perimeter of the transparent illuminator window 408 to the cover glass 404 (or to the ceramic cover 404). The exterior surface of the cover glass 404 (or ceramic cover 404) and/or the transparent illuminator window 408 can be lapped to be planar over the transparent illuminator window 408, the second bonding interface 410B and the adjacent region 411 of the cover glass 404 (or ceramic cover 404).

The second bonding interface 410B may comprise a fusion bond of glass material of the perimeter of the transparent illuminator window 408 to substantially similar or substantially different glass material of the cover glass 404. Such fusion bond 4108 may be formed by the heating discussed previously herein for securing the transparent illuminator window 408 to the cover glass 404.

In embodiments where the ceramic cover 404 is used in place of the cover glass 404, the second bonding interface 410B may comprise a fusion bond of glass material of the perimeter of the transparent illuminator window 408 to ceramic material of the ceramic cover 404. Such fusion bond 4108 may be formed by the heating discussed previously herein for securing the transparent illuminator window 408 to the ceramic cover 404.

Similarly, the transparent display window 414 may have a perimeter that is substantially encircled by a third bonding interface 410C for substantially securing the perimeter of the transparent display window 414 to the cover glass 404 (or to the ceramic cover 404). The exterior surface of the cover glass 404 (or ceramic cover 404) and/or the transparent display window 414 can be lapped to be planar over the transparent display window 414, the third bonding interface 410C and the adjacent region 411 of the cover glass 404 (or ceramic cover 404).

The third bonding interface 410C may comprise a fusion bond of glass material of the perimeter of the transparent display window 414 to substantially similar or substantially different glass material of the cover glass 404. Such fusion bond 410C may be formed by the heating discussed previously herein for securing the transparent display window 414 to the cover glass 404.

In embodiments where the ceramic cover 404 is used in place of the cover glass 404, the third bonding interface 410C may comprise a fusion bond of glass material of the perimeter of the transparent display window 414 to ceramic material of the ceramic cover 404. Such fusion bond 410C may be formed by the heating discussed previously herein for securing the transparent display window 414 to the ceramic cover 404.

Figure 5A:
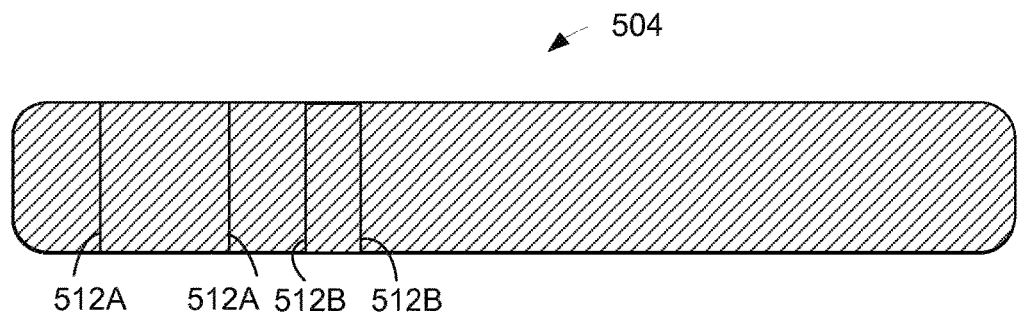
FIGS. 5A-5C are simplified cross sectional views illustrating embodiments for processing glass material of cover glass or ceramic material of ceramic cover.
Figure 5B:
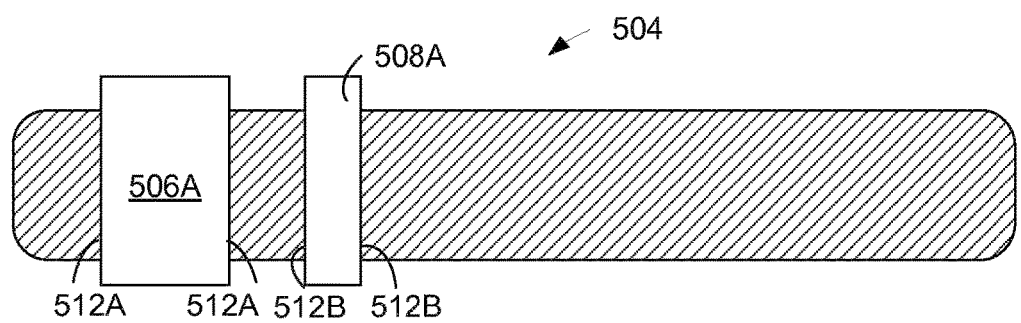
Figure 5C:
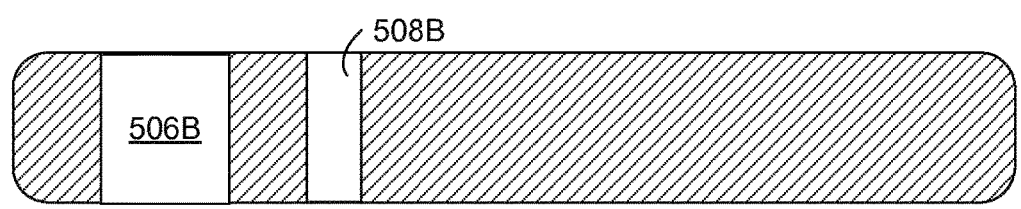

FIGS. 5A-5C are simplified cross sectional views illustrating embodiments for processing glass material of cover glass 504, or ceramic material of ceramic cover 504. FIG. 5A shows a cross sectional view of cover glass 504 (or processed ceramic cover 504) after first and second apertures 512A, 512B have been formed in the cover glass 504 (or in ceramic cover 504.) A third aperture for receiving the transparent display window is not shown in FIGS. 5A-5C. As mentioned previously, apertures may be formed in various ways, for example by drilling, cutting, milling or other machining techniques. In the embodiment shown in FIG. 5A, the glass material of the cover glass 504 (or the ceramic material of the ceramic cover 504) can be dark or opaque, as representatively illustrated by right to left hatching.

FIG. 5B shows a cross sectional view of the dark or opaque cover glass 504 (or ceramic cover 504) after an elongated/thickened transparent camera window 506A and elongated/thickened transparent illuminator window 508A have been disposed within first and second apertures 512A, 512B extending through the dark or opaque cover glass 504 (or ceramic cover 504). Similarly, an elongated/thickened transparent display window may be disposed in within a third aperture (not shown in FIG. 5B).

The transparent camera window 506 and transparent illuminator window 508 and transparent display window can be formed as a suitably sized glass plugs or pegs or pieces, and may be hot pressed in place at a suitable temperature, for example approximately six hundred (600) to approximately seven hundred (700) degrees Celsius (° C.). Such heat may be applied for securing any of the transparent camera window 506, the transparent illuminator window 508 and the transparent display window to the cover glass 504 (or to the ceramic cover 504.)

In other words, the elongated/thickened transparent camera window 506A and the elongated/thickened transparent illuminator window 508A and the elongated/thickened transparent display window can be formed as elongated/thickened glass plugs, pegs or pieces, and can be hot pressed in place at a suitable temperature, for example approximately six hundred (600) to approximately seven hundred (700) degrees Celsius (° C.). As will be discussed next, the elongated/thickened transparent camera window 506A, the elongated/thickened transparent illuminator window 508A and the elongated/thickened transparent display window can be lapped down, using a suitable abrasive slurry (e.g., comprising cesium oxide), so that the exterior surface of the dark opaque cover glass 504 (or ceramic cover 504) can be planar.

For example, as shown in cross sectional view in FIG. 5C, the dark or opaque cover glass 504 (or ceramic cover 504) can have a substantially smooth exterior surface comprising the transparent camera window 506B and the transparent illuminator window 508B. The transparent display window is not shown in FIG. 5C. The resulting exterior surface of the dark or opaque cover glass 504 (or ceramic cover 504) can be planar over the transparent camera window 506B, the transparent illuminator 508B, and the transparent display window as well as over adjacent region 511 of the dark or opaque cover glass 504 (or ceramic cover 504).

Figure 5D:
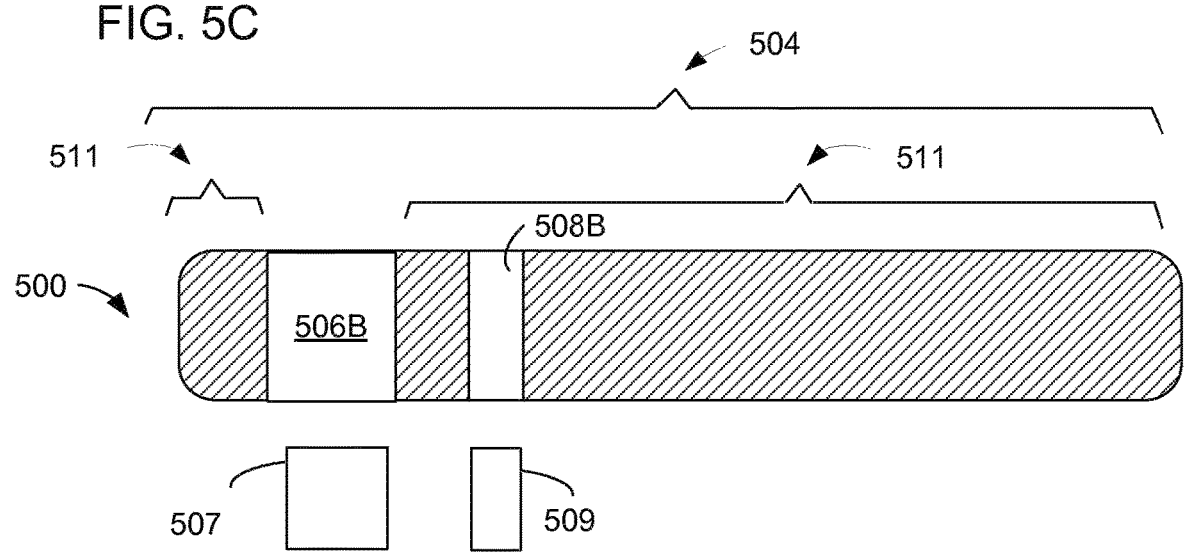
FIG. 5D is a simplified cross sectional view of a consumer electronic product.

FIG. 5D is a simplified cross sectional view of a consumer electronic product 500. The consumer electronic product 500 can comprise a housing and electrical components disposed at least partially internal to the housing. The electrical components can include at least a camera 507 and illuminator 509.

The consumer electronic product 500 can include the cover glass 504 (or ceramic cover 504) coupled to a housing. The cover glass 504 (or ceramic cover 504) can include the transparent camera window 506B, the transparent illuminator window 508B and adjacent region 511 (glass or ceramic) that is dark or opaque. The transparent display window is not shown in FIG. 5D. The camera 507 can be arranged adjacent to the transparent camera window 506B. The illuminator 509 can be arranged adjacent to the transparent illuminator window. The adjacent region 511 can be sufficiently dark or opaque for substantially reducing glare at the camera 507 via the cover glass 504 (or ceramic cover.)

The cover glass 504 (or ceramic cover 504) can have a substantially smooth exterior surface extending over the transparent camera window 506B, the transparent illuminator window 508B, the transparent display window and the adjacent region 511. The cover glass 504 (or ceramic cover 504) can have an exterior surface that is lapped to be planar over the transparent camera window 506B, the transparent illuminator window 508B, the transparent display window and the adjacent region 511.

Figure 6:
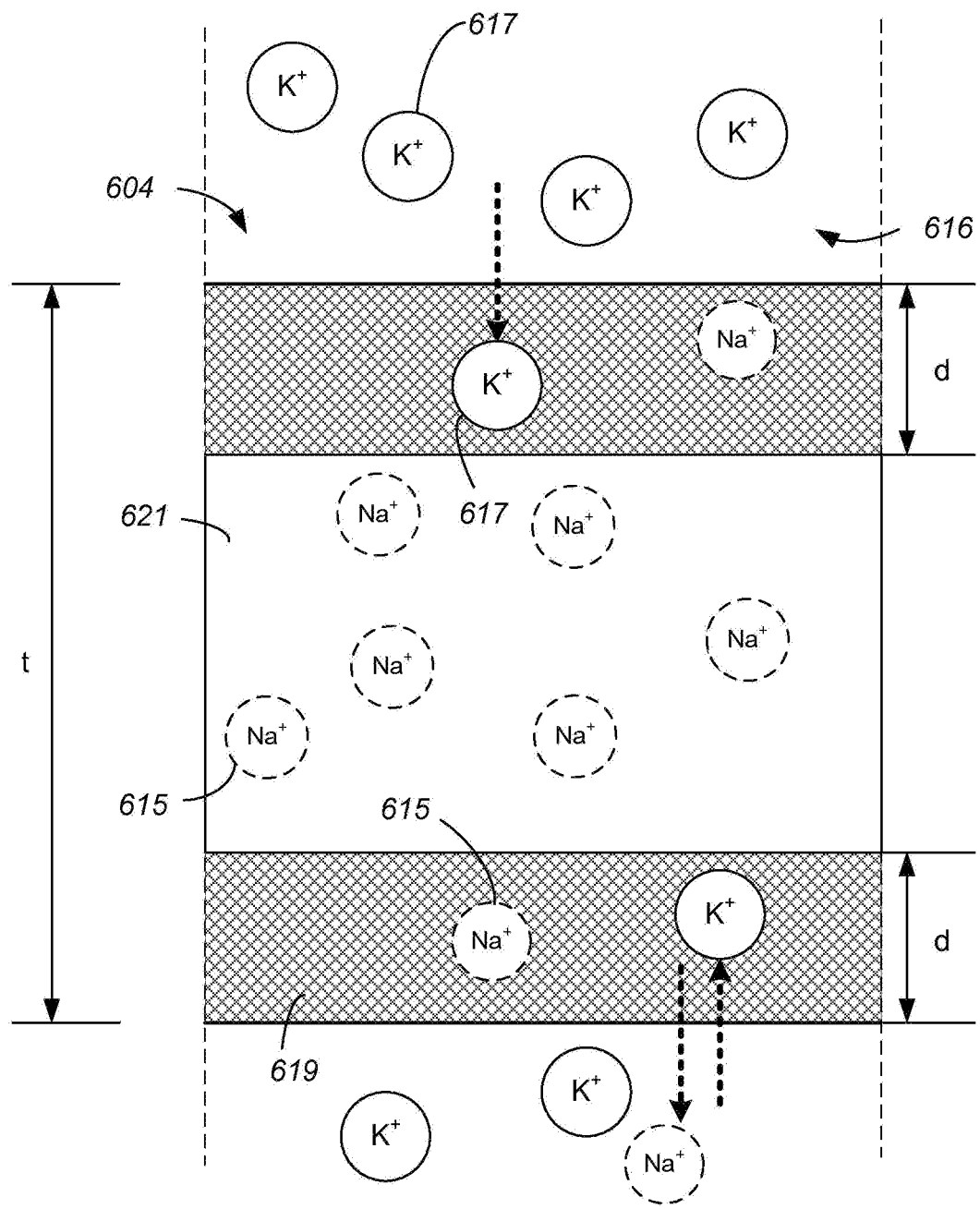
FIG. 6 is a diagram showing a detailed partial cross sectional view of chemical strengthening of exposed surface portions of a cover.

FIG. 6 is a diagram showing a detailed partial cross sectional view of chemical strengthening of exposed surface portions of a cover, such as cover glass 604. FIG. 6 diagrammatically illustrates a chemical treatment process of submerging the cover glass 604 in a heated potassium bath 616 (for example a molten KNO3 bath), for chemically strengthening the cover glass 604. When the cover glass 604 is submerged or soaked in the heated potassium bath 616, diffusion and ion exchange can occur at exposed surface portions of the cover glass 604.

As shown in FIG. 6, $Na^+$ ions 615 which are present in cover glass 604 can diffuse into potassium bath 616, while $K^+$ ions 617 in potassium bath 616 can diffuse into cover glass 604 such that a compressive surface layer 619 can be formed. In other words, $K^+$ ions 617 from potassium bath 616 can be exchanged with $Na^+$ ions 615 to form compressive surface layer 619. The $K^+$ ions 617 can provide a compressive stress surface stress (CS) of the compressive surface layer 619, which chemically strengthens the compressive surface layer 619 of the cover glass 604. Compressive surface layer 619 is highlighted using cross hatching.

Cover glass 604 is shown in FIG. 6 as having a thickness (t). By controlling chemical treatment parameters such as the length of time of chemical strengthening treatment and/or the concentration of $K^+$ ions 617 in potassium bath 616, a depth (d) of compressive surface layer 619 and compressive stress surface stress (CS) of the compressive surface layer 619 may be substantially controlled. In some cases, $K^+$ ions 617 may not diffuse into a center portion 621 of the cover glass 604. In FIG. 6, the center portion 621 is shown without cross hatching. The central portion 621 of the cover glass 604 can have a central tension (CT) in response to the compressive stress surface stress (CS) of the compressive surface layer 619.

Such chemical strengthening can strengthen glass material of the transparent camera window, the transparent illuminator window and the transparent display window, as well as adjacent regions of the cover glass. Further, some ceramics can be chemically strengthened. In embodiments using the ceramic cover in place of the cover glass, if ceramic material of ceramic cover can be chemically strengthened, then the ceramic cover may be chemically strengthened. In such case, chemical strengthening can strengthen adjacent regions of the ceramic cover.

Figure 7A:
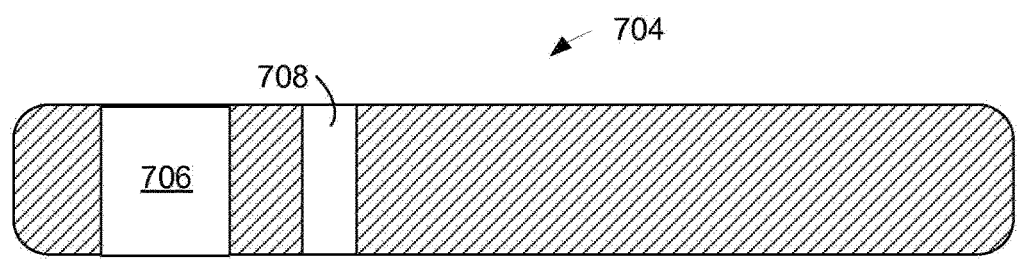
FIGS. 7A and 7B are simplified cross sectional views illustrating embodiments for chemical strengthening of a cover glass or ceramic cover.
Figure 7B:
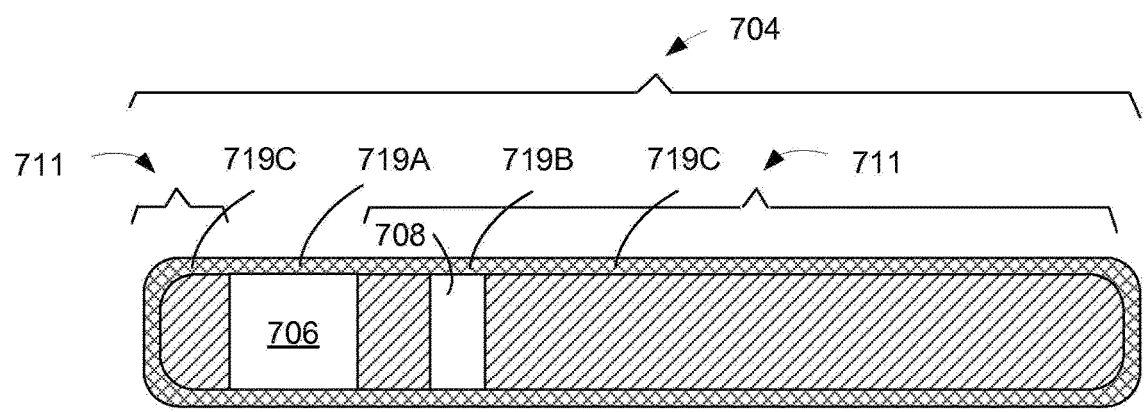

FIGS. 7A and 7B are simplified cross sectional views illustrating embodiments for chemical strengthening of a cover glass 704 (or ceramic cover 704). FIG. 7A shows the cover glass 704 (or ceramic cover 704) prior to any chemical strengthening. FIG. 7B shows the cover glass 704 (or ceramic cover 704) after chemical strengthening.

As shown in FIGS. 7A and 7B, the cover glass 704 (or ceramic cover 704) can have a substantially smooth exterior surface comprising transparent camera window 706 and transparent illuminator window 708. Transparent display window is not shown in FIGS. 7A and 7B. The exterior surface of the cover glass 704 (or ceramic cover 704) can be lapped, for example prior to chemical strengthening, to be planar over the transparent camera window 706, the transparent illuminator window 708, the transparent display window and an adjacent region 711 of the cover glass 704 (or ceramic cover 704).

After chemical strengthening, FIG. 7B shows a chemically strengthened surface 719A of the glass material of the transparent camera window 706. FIG. 7B also shows a chemically strengthened surface 719B of the glass material of the transparent illuminator window 708. A chemically strengthened surface of the transparent display window is not shown in FIG. 7B. However, FIG. 7B also shows a chemically strengthened surface 719C of the adjacent region 711 of the cover glass 704. In embodiments where ceramic cover 704 is used in place of the cover glass 704, and where the ceramic cover 704 may be chemically strengthened, such chemical strengthening can strengthen adjacent regions 711 of the ceramic cover 704. In the figures, chemical strengthening of surfaces is representatively illustrated using cross hatching.

Figure 7C:
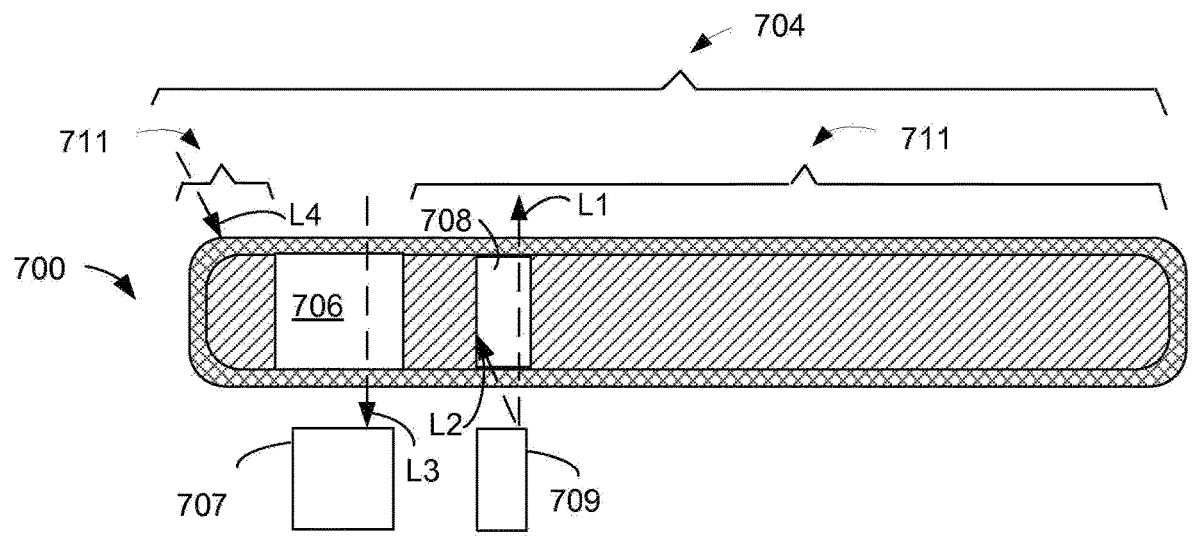
FIG. 7C is a simplified cross sectional view of another embodiment of a consumer electronic product.

FIG. 7C is a simplified cross sectional view of another embodiment of a consumer electronic product 700 comprising a housing and electrical components disposed at least partially internal to the housing, wherein the electrical components include at least a camera 707 and illuminator 709. The cover glass 704 (or ceramic cover 704) can be coupled to the housing.

The cover glass 704 (or ceramic cover 704) can comprise the transparent camera window 706 having the chemically strengthened surface, the transparent illuminator window 708 having the chemically strengthened surface, and the transparent display window having the chemically strengthened surface. The cover glass 704 (or ceramic cover 704) can comprise the adjacent region 711 having chemically strengthened surface. The camera 707 can be arranged adjacent to the transparent camera window 706. The illuminator 709 can be arranged adjacent to the transparent illuminator window 709. Although not shown in FIG. 7C, the display can be arranged adjacent to the transparent display window.

Illumination from the illuminator 709 is shown in FIG. 7C as projecting outwardly through the transparent illuminator window 108 and its chemically strengthened surface. This illumination L1 is depicted in FIG. 7C by notional dashed line arrow L1. As illumination L1 from the illuminator 709 projects outwardly through the transparent illuminator window 708, some stray light rays L2 from the illuminator (as depicted by notional dashed line arrow L2) may be substantially attenuated as they encounter dark or opaque glass material of the cover glass 704 (or dark or opaque ceramic material of the ceramic cover 704). Accordingly, dark or opaque glass material of the cover glass 704 (or dark or opaque ceramic material of the ceramic cover 104) is shown in FIG. 7C as substantially blocking the notional dashed line arrow L2, so as to depict substantial reduction in veiling glare from illuminator 709.

The camera 707 can be arranged adjacent to the transparent camera window 706, and the camera 707 can receive intended light rays L3 through transparent camera window 706 and its chemically strengthened surface. By receiving intended light rays L3 through transparent camera window 706, the camera 707 may capture images or video through the cover glass 704 (or ceramic cover 704).

The adjacent region 711 of the cover glass 704 (or ceramic cover 704) can be sufficiently dark or opaque for substantially reducing veiling glare at the camera 707 via the cover glass 704 (or ceramic cover 704). Dark or opaque glass material of the cover glass 704 (or dark or opaque ceramic material of the ceramic cover 704) may substantially reduce veiling glare, substantially inhibiting such diffuse stray light from reaching the image plane of the camera. Such veiling glare might otherwise reduce contrast and resolution of images or video captured by the camera 707.

The illuminator 709 has already been discussed in detail as one possible source of veiling glare, which may arise from within the electronic device 700. However, there may be other possible sources of veiling glare, which may arise from outside the electronic device 700. Additional stray light rays L4 are shown in FIG. 7C as arising from outside the electronic device (and are depicted in FIG. 7C by notional dashed line arrow L4). Such additional stray light rays L4 arising from outside the electronic device may be substantially attenuated and/or reduced as they encounter dark or opaque glass material of the cover glass 704 (or dark or opaque ceramic material of the ceramic cover 704). Accordingly, dark or opaque glass material of the cover glass 704 (or dark or opaque ceramic material of the ceramic cover 704) is shown in FIG. 7C as substantially blocking the notional dashed line arrow L4, so as to depict such substantial reduction in veiling glare arising from outside electronic device 700.

Figure 8:
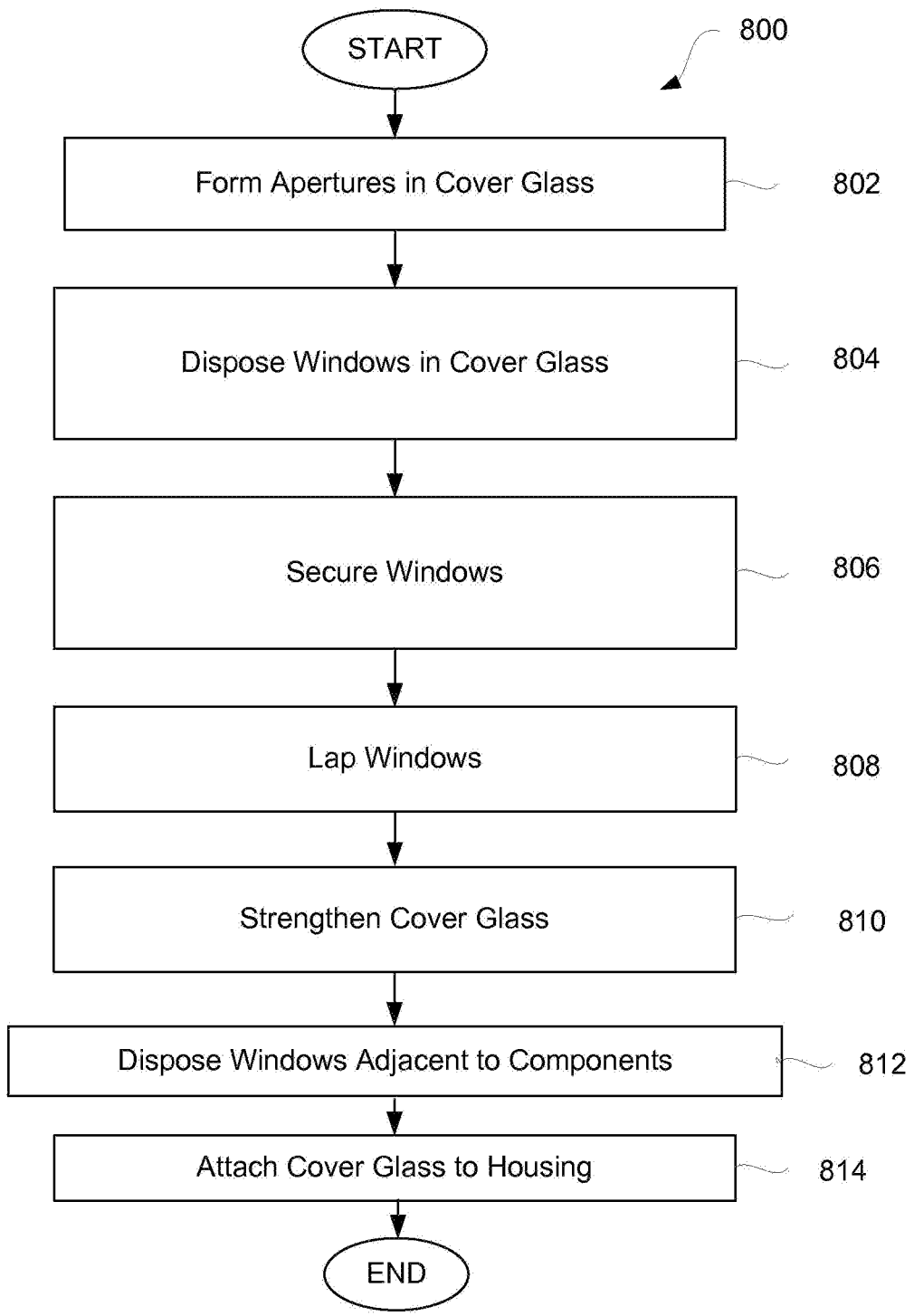
FIG. 8 is a flow diagram illustrating an assembly process according to one embodiment.

FIG. 8 is a flow diagram illustrating an assembly process 800 according to one embodiment. The assembly process 800 may begin by forming 802 one or more apertures in a cover glass. For example, a first aperture may be formed for receiving a transparent camera window, a second aperture may be formed for receiving a transparent illuminator window, and a third aperture may be formed for receiving a transparent display window. The apertures may be formed in various ways, for example by drilling, cutting, milling or other machining.

The process 800 may continue by disposing 804 windows in the cover glass. For example, the transparent camera window may be disposed in the first aperture, which may extend through the cover glass. The transparent illuminator window may be disposed in the second aperture, which likewise may extend through the cover glass. The transparent display window may be disposed in the third aperture, which likewise may extend through the cover glass.

The process 800 may continue by securing 806 one or more windows, such as securing the transparent camera window in the first aperture of the cover glass, securing the transparent illuminator window in the second aperture of the cover glass, and securing the transparent display window in the third aperture of the cover class. For a tight fit, the windows can be heated (i.e., to become compliant) and pressed into place within the apertures.

In securing 806 the windows, such windows may be sufficiently heated so that the glass material of the windows may be substantially compliant and may be pressed into place in the apertures. In securing the windows 806, the windows may be sufficiently heated for fusion bonding glass material of the windows to glass material of the cover glass. Such heating at a suitable temperature may be used, for example approximately six hundred (600) to approximately seven hundred (700) degrees Celsius (° C.).

For example, a first bonding interface may be formed comprising a fusion bond of glass material of a perimeter of the transparent camera window to substantially similar or substantially different glass material of the cover glass. A second bonding interface may be formed comprising a fusion bond of glass material of a perimeter of the transparent illuminator window to substantially similar or substantially different glass material of the cover glass. A third bonding interface may be formed comprising a fusion bond of glass material of a perimeter of the transparent display window to substantially similar or substantially different glass material of the cover glass.

The process 800 may continue with lapping 808 the transparent camera window and transparent illuminator window and transparent display window such that the transparent camera window and the transparent illuminator window and the transparent display window and an adjacent glass region of the cover glass yield a planar exterior surface of the cover glass.

The process 800 may continue with strengthening 810 the cover glass. For example, chemical strengthening may strengthen glass material of the transparent camera window and of the transparent illuminator window and of the transparent display window, as well as adjacent glass regions of the cover glass.

The process 800 may continue with disposing 812 windows adjacent to components or an electronic product. For example, the transparent camera window may be disposed adjacent to a camera of the electronic product. The transparent illuminator window may be disposed adjacent to an illuminator of the electronic product. The transparent display window may be disposed adjacent to a display of the electronic product. The process 800 may continue with subsequently attaching 812 the cover glass to a housing for the electronic product. Once the cover glass has been attached to the housing, the assembly process 800 can end.

Figure 9:
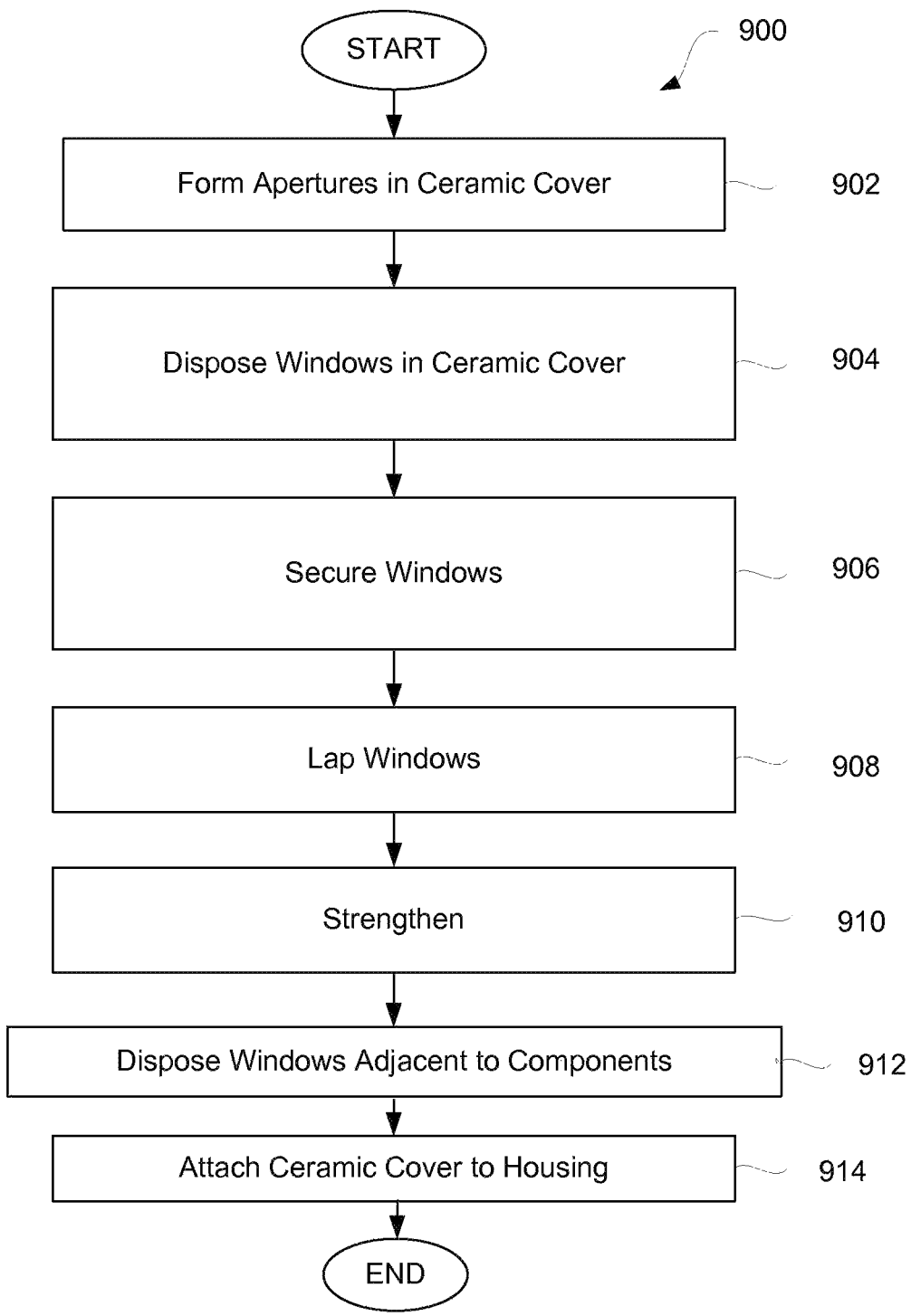
FIG. 9 is a flow diagram illustrating an assembly process according to another embodiment.

FIG. 9 is a flow diagram illustrating an assembly process 900 according to another embodiment. The assembly process 900 may begin by forming 902 one or more apertures in a ceramic cover. For example, a first aperture may be formed for receiving a transparent camera window, a second aperture may be formed for receiving a transparent illuminator window and a third aperture may be formed for receiving a transparent display window. The apertures may be formed in various ways, for example by drilling, cutting, milling or other machining.

The process 900 may continue by disposing 904 windows in the ceramic cover. For example, the transparent camera window may be disposed in the first aperture, which may extend through the ceramic cover. The transparent illuminator window may be disposed in the second aperture, which may likewise extend through the ceramic cover. The transparent display window may be disposed in the third aperture, which may likewise extend through the ceramic cover.

The process 900 may continue by securing 906 one or more windows, such as securing the transparent camera window in the first aperture of the ceramic cover, securing the transparent illuminator window in the second aperture of the ceramic cover and securing the transparent display window in the third aperture of the ceramic cover. For a tight fit, the windows can be heated (i.e., to become compliant) and pressed into place within the apertures.

In securing 906 the windows, the windows may be sufficiently heated so that the glass material of the windows may be substantially compliant and may be pressed into place in the apertures. In securing the windows 906, the windows may be sufficiently heated for fusion bonding glass material of the windows to ceramic material of the ceramic cover. Such heating at a suitable temperature may be used, for example approximately six hundred (600) to approximately seven hundred (700) degrees Celsius (° C.).

For example, a first bonding interface may be formed comprising a fusion bond of glass material of a perimeter of the transparent camera window to ceramic material of the ceramic cover. A second bonding interface may be formed comprising a fusion bond of glass material of a perimeter of the transparent illuminator window to ceramic material of the ceramic cover. A second bonding interface may be formed comprising a fusion bond of glass mater of a perimeter of the transparent display window to ceramic material of the ceramic cover.

The process 900 may continue with lapping 908 the transparent camera window, the transparent illuminator window and the transparent display window such that the transparent camera window, the transparent illuminator window, the transparent display window and an adjacent ceramic region of the ceramic cover yield a planar exterior surface of the ceramic cover.

The process 900 may continue with strengthening 910. For example, chemical strengthening may strengthen glass material of the transparent camera window and of the transparent illuminator window and of the transparent display window. Some ceramic materials may be chemically strengthened. Where ceramic material of the ceramic cover may be chemically strengthened, such chemical strengthening can strengthen adjacent ceramic regions of the ceramic cover.

The process 900 may continue with disposing 912 windows adjacent to components or an electronic product. For example, the transparent camera window may be disposed adjacent to a camera of the electronic product. The transparent illuminator window may be disposed adjacent to an illuminator of the electronic product. The transparent display window may be disposed adjacent to a display of the electronic product. The process 900 may continue with subsequently attaching 912 the ceramic cover to a housing for the electronic product. Once the ceramic cover has been attached to the housing, the assembly process 900 can end.

Embodiments of the invention are well suited for portable, battery-powered electronic devices, and more particularly handheld battery-powered electronic devices. Examples of portable, battery-powered electronic devices can include laptops, tablet computers, media players, phones, GPS units, remote controls, personal digital assistant (PDAs), and the like.

The various aspects, features, embodiments or implementations of the invention described above can be used alone or in various combinations.

The advantages of the invention are numerous. Different aspects, embodiments or implementations may (but need not) yield one or more of the following advantages. One advantage of the invention is that cover glass (or ceramic cover) can be strengthened, even at a camera window region and/or illuminator window region, to protect from damage that would otherwise result from a drop event. Another advantage is efficiency and/or pleasing appearance in integrating a transparent camera window and transparent illuminator window into the cover glass or ceramic cover. Another advantage is improved image or video quality, which may result from substantially reducing veiling glare.

The many features and advantages of the invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described.

Hence, all suitable modifications and equivalents may be resorted to as falling within the scope of the invention.

What is claimed is:

1. An electronic device comprising:
a housing;
a display positioned at least partially within the housing;
a camera positioned at least partially within the housing;
a glass cover attached to the housing and having a dark glass region that extends from an outer cover surface of the glass cover glass to an inner cover surface of the glass cover glass, the glass cover defining an aperture that extends through the dark glass region; and
a transparent window positioned in the aperture and bonded to the dark glass region, the transparent window defining an outer window surface and an inner window surface opposite to the outer window surface, the inner cover surface being coplanar with the inner window surface.

2. The electronic device of claim 1, wherein: the aperture defines an inner wall; and
the transparent window is fusion bonded to the inner wall of the aperture.

3. The electronic device of claim 1, wherein the inner cover surface and the inner window surface define a smooth continuous interior surface.

4. The electronic device of claim 1, wherein the outer cover surface and the outer window surface are coplanar and define a smooth continuous exterior surface of the electronic device.

5. The electronic device of claim 1, wherein: the glass cover defines a transparent glass region; and the transparent glass region is positioned over the display.

6. The electronic device of claim 1, wherein: the aperture is a camera aperture; the glass cover further comprises an illuminator aperture that extends through the glass cover; an illuminator window is positioned within the illuminator aperture; and the electronic device further comprises an illuminator component positioned below the illuminator window.

7. The electronic device of claim 1, wherein both the glass cover and the transparent window are chemically strengthened.

8. An electronic device comprising:
a housing;
a display positioned at least partially within the housing;
a cover positioned over the display and defining a transparent glass region and a dark glass region that extends from an outer cover surface to an inner cover surface, the display viewable through the transparent glass region, the dark glass region defining a sensor aperture that extends through the dark glass region;
a glass window positioned within the sensor aperture and bonded to the dark glass region, the glass window defining an inner window surface that is aligned with the inner cover surface; and
an optical sensor positioned within the housing and below the glass window.

9. The electronic device of claim 8, wherein: the sensor aperture defines an inner wall surface; and the glass window is directly bonded to the inner wall surface of the sensor aperture.

10. The electronic device of claim 9, wherein the glass window is fusion bonded to the inner wall surface of the sensor aperture.

11. The electronic device of claim 8, wherein:
the cover further defines an illuminator aperture that extends through the cover;
an illuminator window is positioned within the illuminator aperture; and
the electronic device further comprises an illuminator positioned below the illuminator window.

12. The electronic device of claim 11, wherein the dark glass region reduces light produced from the illuminator from being transmitted through the cover to the optical sensor.

13. The electronic device of claim 11, wherein: the optical sensor is a camera; and the illuminator is an optical flash.

14. A method of forming a glass cover for an electronic device, the method comprising:
forming a camera aperture through a dark glass portion of a glass sheet;
forming an illuminator aperture through the glass sheet;
positioning a camera window in the camera aperture;
bonding the camera window to a first inner glass wall that defines the camera aperture;
positioning an illuminator window in the illuminator aperture;
bonding the illuminator window to a second inner glass wall that defines the illuminator aperture to define the glass cover; and
after the camera window is bonded, a lower side of the glass sheet and a lower side of the camera window are lapped to create a lower planar surface.

15. The method of claim 14, wherein:
the camera window is fusion bonded to the first inner glass wall of the camera aperture; and
the illuminator window is fusion bonded to the second inner glass wall of the illuminator aperture.

16. The method of claim 14, wherein: bonding the camera window to the first inner glass wall comprises: heating the camera window to a temperature of 600 degrees Celsius or greater; and pressing the camera window into the camera aperture.

17. The method of claim 14, wherein:
the camera window is bonded to the first inner glass wall by fusion bonding;
the lower planar surface is a first smooth surface;
after the camera window is bounded, an upper side of the glass sheet and an upper side of the camera window are lapped to create a second smooth surface.

18. The method of claim 17, wherein after the upper and lower sides of the glass sheet are lapped, the glass sheet and the camera window are chemically strengthened in an ion exchange process.

19. The method of claim 14, wherein the method further comprises:
chemically strengthening the glass sheet, the camera window, and the illuminator window; and
bonding an inner surface of the glass sheet to a housing to define an exposed exterior surface of the electronic device.

* * * * *